US011486836B1

(12) United States Patent
Diaz et al.

(10) Patent No.: US 11,486,836 B1
(45) Date of Patent: Nov. 1, 2022

(54) METHOD AND SYSTEM FOR DETERMINING THE LOCATION IN 3D SPACE OF AN OBJECT WITHIN AN ENCLOSED OPAQUE CONTAINER

(71) Applicant: The United States of America as Represented by the Secretary of the Navy, Indian Head, MD (US)

(72) Inventors: Angel Diaz, Indian Head, MD (US); David Rivera-Marchand, Alexandria, VA (US); Lonnie Frericks, King George, VA (US); Anthony Wojkowski, Springfield, VA (US); Anthony Kummerer, LaPlata, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 302 days.

(21) Appl. No.: 16/873,764

(22) Filed: Jun. 29, 2020

(51) Int. Cl.
*G01N 23/04* (2018.01)
*G06T 19/00* (2011.01)
*G06T 7/00* (2017.01)

(52) U.S. Cl.
CPC ........... *G01N 23/04* (2013.01); *G06T 7/0008* (2013.01); *G06T 19/006* (2013.01); *G06T 2207/10116* (2013.01)

(58) Field of Classification Search
CPC ......... G06T 7/0008; G06T 2207/10116; G06T 19/006
See application file for complete search history.

(56) References Cited

U.S. PATENT DOCUMENTS

| 7,027,644 | B1 | 4/2006 | Kim et al. |
| 8,111,808 | B1* | 2/2012 | Wood .................. G01N 24/084 378/70 |
| 8,411,820 | B1 | 4/2013 | Browder |
| 8,548,563 | B2 | 10/2013 | Simon |
| 9,002,062 | B2* | 4/2015 | Aller .................... G06V 10/243 382/296 |
| 9,129,427 | B2* | 9/2015 | Golubovic ............. G06T 7/593 |
| 9,268,058 | B2 | 1/2016 | Peschmann et al. |
| 10,019,015 | B2 | 7/2018 | Johnson et al. |
| 2003/0110971 | A1* | 6/2003 | Duguet .................. F42B 3/124 102/202.5 |

(Continued)

*Primary Examiner* — Phi Hoang
(74) *Attorney, Agent, or Firm* — Fredric J. Zimmerman

(57) ABSTRACT

A non-transitory computer readable medium on which is stored machine-readable instructions that, when executed by at least one processor, cause the processor to determine the location in 3D space of an object of interest within the interior region of an opaque container. Hence, a user or operator is allowed to construct a three-dimensional representation of the interior region of the opaque container so as to allow viewing of objects, components and substances within the interior region. The users or operators now have the opportunity to isolate a particular object of interest within the interior region that may be a threat, such as an explosive device or other energetic component. A disrupter device is aimed at the three-dimensional location and thereafter, the disrupter device fires a projectile or substance at the object of interest in order to disable or destroy the object of interest.

26 Claims, 20 Drawing Sheets

(56) References Cited

U.S. PATENT DOCUMENTS

| | | | |
|---|---|---|---|
| 2005/0025280 A1* | 2/2005 | Schulte | G01V 5/0041 |
| | | | 378/57 |
| 2009/0168958 A1 | 7/2009 | Cozzini et al. | |
| 2010/0226478 A1 | 9/2010 | Harding et al. | |
| 2011/0116693 A1* | 5/2011 | Li | H01J 47/001 |
| | | | 382/128 |
| 2012/0041250 A1* | 2/2012 | Ishikawa | A61N 5/1049 |
| | | | 382/103 |
| 2012/0177182 A1 | 7/2012 | Olesinski et al. | |
| 2017/0196525 A1* | 7/2017 | Kim | A61B 6/04 |
| 2019/0046153 A1* | 2/2019 | Tanaka | A61B 8/488 |
| 2020/0082629 A1* | 3/2020 | Jones | G02B 27/0172 |
| 2020/0197098 A1* | 6/2020 | Chopra | A61B 90/39 |

\* cited by examiner

METHOD AND SYSTEM FOR DETERMINING THE LOCATION IN 3D SPACE OF AN OBJECT WITHIN AN ENCLOSED OPAQUE CONTAINER

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

FIELD OF THE INVENTION

The present invention relates to a method and system for determining the location in 3D space of an object within an interior of an enclosed, opaque container.

BACKGROUND

Conventional methods and systems to visualize and aim at the contents of the interior of an opaque package or container typically use a fiducial grid in conjunction with an x-ray radiation source. Visualizing the contents of the interior of the opaque item is necessary in order to identify any objects of interest. Typically, an object of interest is considered a suspicious object that may be an explosive device or some other type of energetic. The object of interest is usually adjacent to or surrounded by other objects that are not deemed to be suspicious or threatening. A disrupter device or tool is then aimed at the location of the object of interest. The disrupter device or tool then fires or propels a projectile or substance at the object of interest in order to disable or destroy the object of interest. However, such conventional techniques and methods limit the aiming position of the disrupter device exclusively to the position of the x-ray radiation source. Consequently, such a limitation significantly constrains the space in which operators or personnel may operate. Furthermore, if it is not feasible to fire the disrupter device from a particular location and/or angle due to sensitive obstructions, then it will be necessary to re-position the x-ray radiation source so as to determine if there is a feasible line-of-fire from another position or angle that will not impact such sensitive obstructions or other objects not deemed to be threatening.

What is needed is a new and improved method and system for accurately visualizing the contents of an opaque item and determining the three-dimensional location of an object of interest located within the interior of an opaque item.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Exemplary embodiments described herein provide methods, systems, computing devices and non-transitory computer readable mediums for accurately visualizing the contents of an opaque container and determining the three-dimensional location of an object of interest located within the interior of the opaque container. The opaque container may be any type of nontransparent article having an interior region in which objects may be kept or stored. Generally, opaque containers include luggage, knap sacks, brief cases, shipping crates, barrels or any other nontransparent container, box or package. A user or operator is allowed to construct a three-dimensional representation of the interior region of the opaque container so as to allow viewing of objects, components and substances within the interior region. The users or operators now have the opportunity to isolate a particular item of interest within the interior region that may be a threat, such as an explosive device or other energetic component. A disrupter device is aimed at the three-dimensional location and thereafter, the disrupter device fires a projectile or substance at the object of interest (i.e. target) in order to disable or destroy the object of interest. In some exemplary embodiments, the system includes an imaging recording device, a display screen, at least one processor in electronic data signal communication with the imaging recording device and display screen, and at least one memory medium in electronic data signal communication with the at least one processor. The at least one processor is programmed to generate a graphical user interface for display on the display screen. In an exemplary embodiment, the image recording device and display screen are positioned or located adjacent to the disrupter device. In some embodiments, the image recording device and display screen are attached to the disrupter device and therefore move with the disrupter voice. The image recording device is configured to provide live video feeds. The image recording device, display screen and at least one processor cooperate to provide augmented reality (AR) and virtual reality (VR) imagery. At least one processor executes one or more algorithms, including advanced computer vision (ACV) and digital image processing algorithms, which provide visualization, based on a virtual reality environment and/or augmented reality environment. In order to accurately visualize the contents of the opaque container and determine the three-dimensional location of the object of interest located within the opaque container, a collapsible frame is positioned adjacent to the opaque container. The collapsible frame includes two physical or real world partition members or walls. In some embodiments, the real world partition members are movably attached to each other such that the collapsible frame opens and closes like a book. Each real world partition member has a predefined unique image thereon. The predefined unique image on one of the real world partition members is different than the predefined unique image on the other real world partition member. Each real world partition member is fabricated from a relatively low density material and includes a plurality of tungsten fiducial markers. At least one processor is programmed with a first digital data set that defines the predefined unique image on a first one of the real world partition members and a second digital data set that defines the predefined unique image on a second one of the real world partition members. The collapsible frame is positioned near the opaque container so that one real world partition member faces one side of the opaque container and the other real world partition member faces the other side of the opaque container. The image recording device captures the predefined unique image on each real world partition member. The computer vision algorithms enable recognition of the predefined unique image on each of the real world partition members. A first x-ray film is positioned opposite one side of the opaque container such that the opaque container is positioned between the first real world partition member and the first x-ray film. A second x-ray film is positioned opposite another side of the opaque container such that the opaque container is positioned between the second real world partition member and the second x-ray film. Two x-rays are taken along planes that are orthogonal to the predefined unique images on both real world partition members. At least one processor determines orthogonality of the x-ray radiation with respect to the unique images on the real world partition members. Once the x-rays are taken, the x-ray images are digitized imported into at least one memory medium that is in electronic data communication with the at least one processor. The tungsten fiducial markers are visible on the digitized x-ray images. Each digitized x-ray image is scaled, positioned and oriented. The predefined unique images on each real world partition member do not appear on the digital x-ray images. At least one processor processes the images of the real world partition members captured by the image recording device and executes software that generates a virtual reality depiction of each predefined unique image. The tungsten fiducial markers are represented by corresponding icons in the virtual reality depictions of the predefined unique images. In an exemplary embodiment, each fiducial marker shown in a virtual reality depiction is represented by a different color icon. As a result, for each digital x-ray image, there is a corresponding virtual reality depiction of the predefined unique image that is on the real world partition member that was x-rayed. One at a time, each digital x-ray image is selected and imported to at least one processor. For the first selected digital x-ray image, the first step is to retrieve the virtual depiction of the predefined unique image that is on the real world partition member that corresponds to that first selected digital x-ray image. Two fiducial markers on the virtual reality depiction are selected, one at a time, and are mapped to corresponding fiducial markers on the digital x-ray image in order to define a first reference point. The same mapping steps are done for the second digital x-ray image so as to produce a second reference point. During the mapping procedure, a user or operator can zoom in and out and/or drag the digital x-ray image for better accuracy. At least one processor implements a scaling process that uses the reference points produced in the mapping step to calibrate the digital x-ray images to true size and position. In some embodiments, the scaling process allows the user or operator to input, by the graphical user interface, the real distance from the unique image on the real world partition member to the corresponding x-ray film. The aforementioned method steps generate a three-dimensional representation of the interior region of the opaque container. which allows users or operators to view the objects, components, substances, etc. that are within the interior region. Objects of interest within the interior region are identified and highlighted using geometrical shapes provided by the software executed by at least one processor. The geometrical shapes may be moved, scaled, rotated and deleted. The color of the geometrical shapes may be changed to distinguish between the object of interest and other objects that are not of interest. A calibration scheme is implemented which provides disrupter sight-alignment. In the calibration scheme, two points in three-dimensional space are selected and used to create a vector that is aligned with the longitudinally extending axis of the bore of the disrupter device. The image recording device is shifted so that the view of the image recording device is aligned with the vector so as to provide a view as seen from the bore of the disrupter device, also referred to as "boresight perspective." Therefore, the vector constitutes an aiming vector for the disrupter device. The disrupter device fires or propels the projectile along the aiming vector such that the projectile impacts the object of interest within the interior of the opaque container.

The advanced computer vision (ACV) algorithms executed by at least one processor provides the image recording device, or other augmented reality (AR) device, with spatial awareness and enables generation of a three-dimensional (3D) rendering of the x-rayed contents of the opaque container in true space and position.

DETAILED DESCRIPTION

Figure 1:
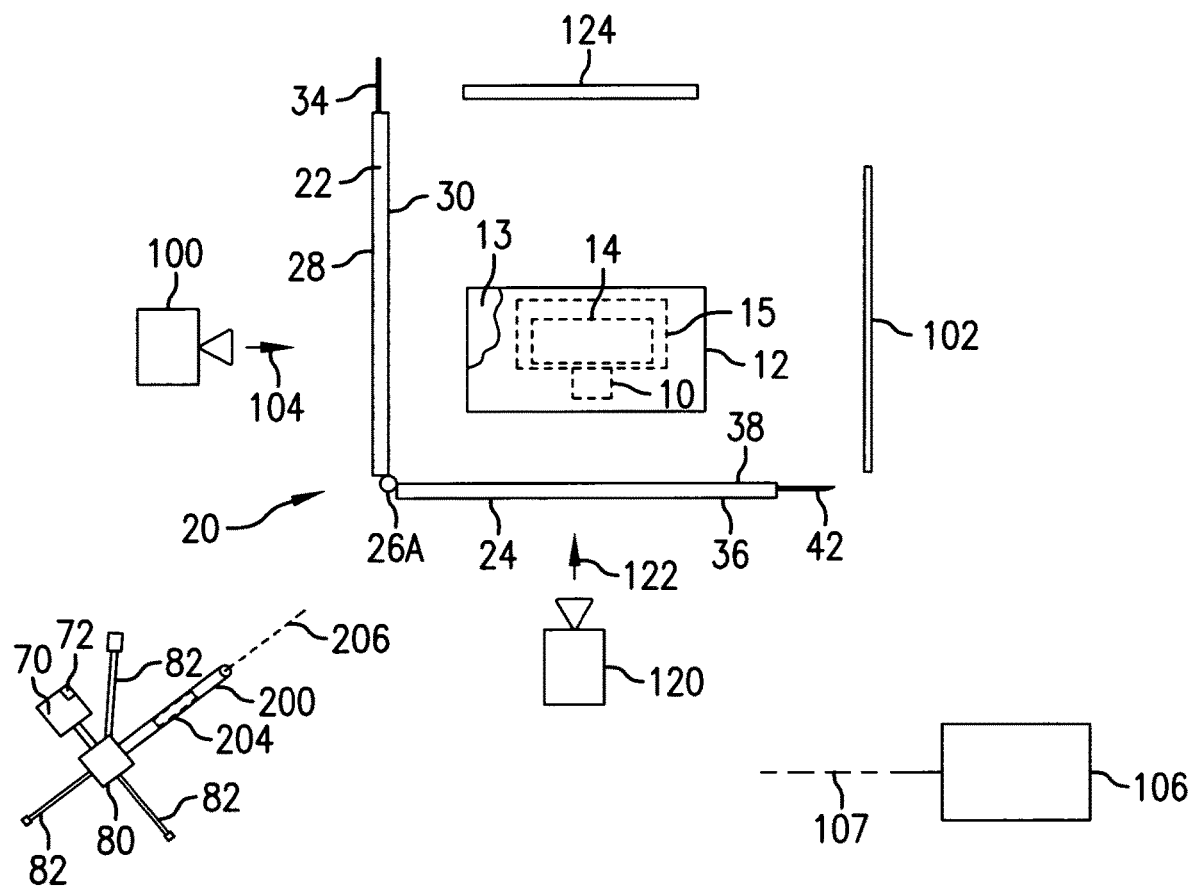
FIG. 1 is a diagram illustrating the placement and location of system components with respect to an opaque container that contains an object that warrants investigation, in accordance with an embodiment.

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

As used herein, terms such as "vertical", "horizontal", "top", "bottom", "upper", "lower", "middle", "above", "below" and the like are used for convenience in identifying relative locations of various components and surfaces relative to one another in reference to the drawings and that the system of the present invention may be installed and used in substantially any orientation so that these terms are not intended to be limiting in any way.

As used herein, the term "determining" encompasses calculating, computing, processing, deriving, investigating, looking up (e.g. looking up in a table, a database or another data structure), ascertaining and the like.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

As used herein, the term "opaque container" shall refer to enclosed, nontransparent containers, including luggage, knap sacks, bags, packages, shipping crates, cardboard boxes, wooden boxes, barrels or any other nontransparent structure or article configured to store, hold or carry items.

As used herein, the term "real world" refers to the real world physical environment and all matter existing therein, as opposed to a "virtual reality world" or an "augmented reality world".

As used herein, "processor" includes, for example, circuits such as an ASIC (Application Specific Integrated Circuit), portions or circuits of individual processor cores, entire processor cores, individual processors, central processing units (CPU), signal processors having analog-to-digital conversion circuitry, programmable hardware devices such as field programmable gate array (FPGA) and or larger portions of systems that include multiple processors.

As used herein, "computer", "computer system" or "computing device" includes any of various types of computing or processing systems, including a personal computer system (PC), mainframe computer system, workstation, network appliance, Internet appliance, personal digital assistant (PDA), personal communication device, smart phone, notebook computer, desk top computer, tablet, television system, grid computing system, or other device or combinations of devices, or any device (or combination of devices) having at least one processor that executes instructions from a memory medium. The aforesaid computing or processing systems are configured to open and process image files having formats, such as JPEG, PDF, PNG, etc.

As used herein, the terms "memory medium" or "memory" include non-transitory computer readable storage mediums and any of various types of memory devices or storage devices, such an installation medium, e.g., a CD-ROM, floppy disks, or tape device. "Memory medium" also includes a computer system memory or random access memory, such as DRAM, DDR RAM, SRAM, SDRAM, EDO RAM, Rambus RAM, and non-volatile memory such as a Flash, magnetic media, hard drive, optical storage, registers or other similar types of memory elements. "Memory medium" may include other types of memory as well or combinations thereof. The term "memory medium" may include two or more memory mediums which may reside in different locations, e.g. in different processors or computers that are connected over a network. The memory medium may store program instructions (e.g., embodied as computer programs) that may be executed by one or more processors.

Components, process or method steps and/or data structures disclosed herein may be implemented using various types of operating systems (OS), computing platforms, firmware, computer programs, application computer programs (e.g. "app" or "App"), computer languages, and/or general-purpose machines. Computer programs include any expression, in any language, code or notation, of a set of instructions intended to cause a system having an information processing capability to perform a particular function. Such set of instructions include machine readable instructions. The method can be run as a programmed process running on one or more processors. Accordingly, the methods disclosed herein may be embedded on a non-transitory computer-readable storage medium which comprises all the features enabling the implementation of the methods described herein, and which when loaded in a computer system, is able to carry out these methods.

Referring to FIG. 1, embodiments described herein provide methods, systems, computing devices and non-transitory computer readable mediums for accurately determining the three-dimensional location of a target or object of interest 10 that is located within the interior region of opaque container 12. Other objects 14 and 15 (shown in phantom) are also located within the interior 13 of opaque container 12. In this example, as shown in FIG. 1, object 15 is positioned on top of object 14 and object 10 is positioned in front of object 14. Objects 14 and 15 also may be objects of interest, or they can be items to be avoided, or they can be neutral objects that are neither hazardous nor pose a threat. Specifically, the method and system disclosed herein allow a user or operator to construct a three-dimensional representation of the interior region of opaque container 12 so as to allow viewing of objects, components and substances within the interior region. The users or operators now have the opportunity to isolate a particular object of interest within the interior region that may be a threat, such as an explosive device or other energetic component. As will be described in the ensuing description, disrupter device 200 is aimed at the three-dimensional location and thereafter, disrupter device 200 fires a projectile or substance at the object of interest in order to disable or destroy target the object of interest. Examples of possible objects of interest that may be in opaque container 12 include containers, packages or bottles that may contain improvised-explosive-devices (IED), plastic explosives, explosive fluids therein or any other type of energetic devices.

Figure 2:
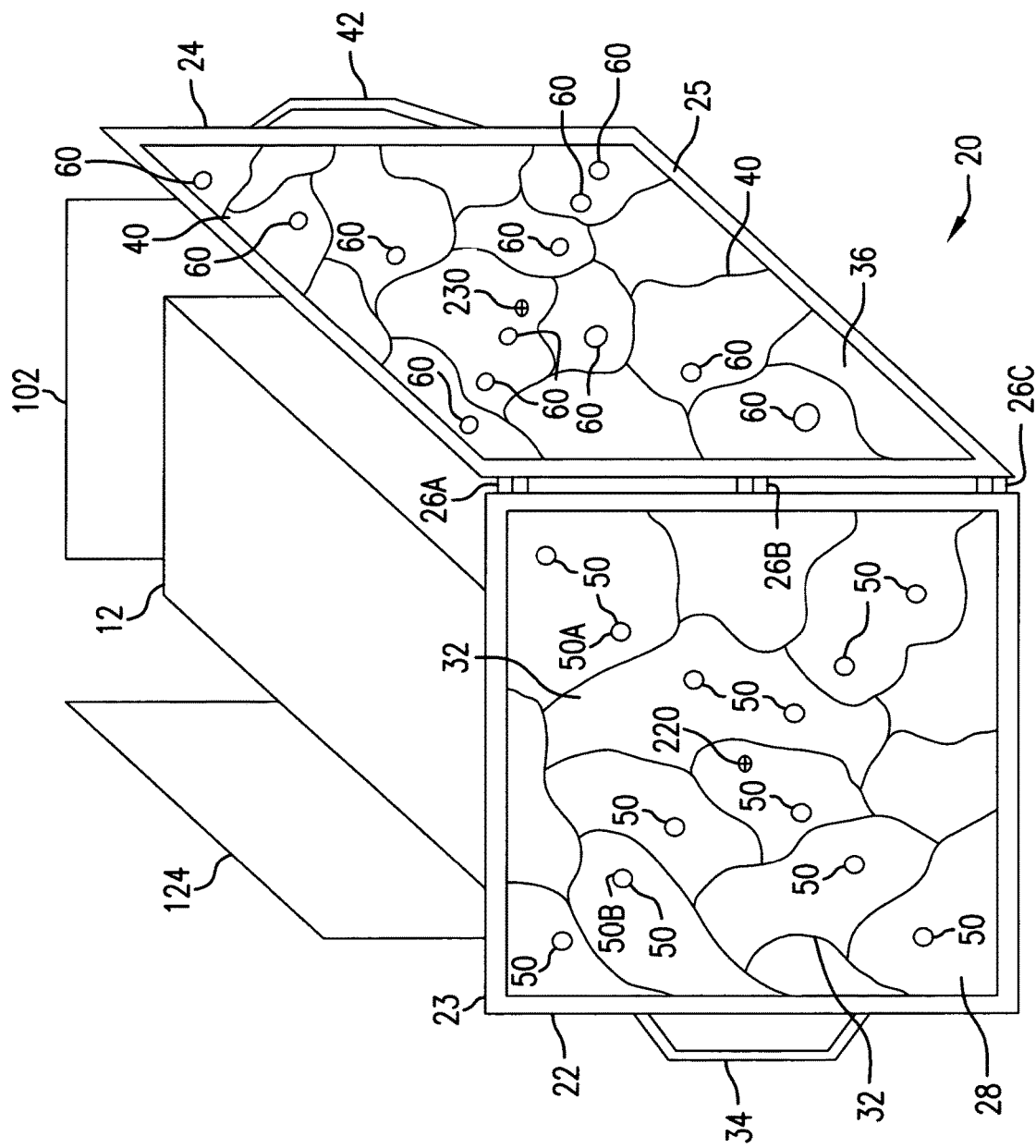
FIG. 2 is a perspective view of a collapsible frame shown in FIG. 1 and its location with respect to the opaque container, the collapsible frame having movable partition members.

Referring to FIGS. 1 and 2, in an embodiment, the system comprises collapsible frame or template 20 that is placed near opaque container 12. Frame 20 includes first partition member 22. First partition member 22 includes perimetrical support member 23. Frame 20 further includes second partition member 24. Second partition member 24 includes perimetrical support member 25. In an exemplary embodiment, partition member 22 and partition member 24 are pivotally or hingedly attached to each other via hinge members 26A, 26B and 26C such that frame 20 can open and close like a book. First partition member 22 and second partition member 24 may be fabricated from any type of suitable material, e.g. plastic, Plexiglas, rubber, etc. First partition member 22 includes first side 28 and opposite second side 30. First partition member 22 defines a first plane. First partition member 22 includes a predefined unique pattern or image 32 formed on the first side 28. In an exemplary embodiment, the predefined unique image 32 comprises a camouflage design. However, it is to be understood that predefined unique image 32 may be configured to have any other suitable design. Since first partition member 22 defines a plane, the camouflage image 32 of first wall 22 is also referred to herein as a "camouflage plane" or "camouflage image". Image 32 is visible only on side 28. Image 32 is formed or fabricated with low-density material. The formation of image 32 is described in detail in the ensuing description. First partition member 22 includes handle section 34. Similarly, second partition member 24 includes first side 36 and opposite second side 38. Second partition member 24 defines a second plane. Second partition member 24 includes a predefined unique image 40 on first side 36. Predefined unique image 40 is different than image 32 on first side 28 of first partition member 22. As a result of such a configuration, image 40 is distinct from image 32. In an exemplary embodiment, image 40 comprises a camouflage design. Since second partition member 24 defines a plane, camouflage image 40 is also referred to herein as a "camouflage plane" or "camouflage image". Image 40 is visible only on first side 36. Image 40 is formed or fabricated with the same low-density material used to form or fabricate image 32. The formation of image 40 is described in detail in the ensuing description. The purpose of images 32 and 40 is explained in the ensuing description. Second partition member 24 further includes handle 42. Handles 34 and 42 allow a user to open frame 20 and to carry or transport frame 20 when not in use. When frame 20 is closed, handles 34 and 42 contact each other.

Images 32 and 40 are random patterns. In one exemplary embodiment, these random patterns are created by suitable image creation software or raster graphics editor software that is configured to graphically design, create and edit images. The user sets or predefines the height and width of the images using the image creation software. Suitable image creation software includes, but is not limited to, Adobe® Photoshop, Adobe® Illustrator, Fatpaint® DrawPlus™, InkScape™ and Ultimate Paint™. Once images 32 and 40 are created, the images are then engraved onto corresponding low-reflectivity and low-density surfaces using a laser-engraver. In an exemplary embodiment, the low-reflectivity and low-density surfaces are rugged and waterproof. In one embodiment, the low-reflectivity and low-density surfaces are plastic sheets, where each image is engraved onto a corresponding plastic sheet. In an exemplary embodiment, images 32 and 40 have substantially the same thicknesses. The camouflage patterns of images 32 and 40 are just examples and it is to be understood that patterns other than camouflage may be used as well. In some embodiments, first partition member 22 includes a frame to which a first plastic sheet, having image 32 thereon, is mounted or attached. In some embodiments, second partition member 24 includes a frame to which a second plastic sheet, having image 40 thereon, is mounted or attached.

The completed images 32 and 40 and their dimensions are processed with one or more commercially available algorithms in order to generate a data set for each image 32 and 40. In one exemplary embodiment, a desktop computer is used to process images 32 and 40 and the corresponding dimensions to generate the data set for each image 32 and 40. In another exemplary embodiment, images 32 and 40 and their corresponding dimensions are fed or inputted into a commercial-off-the-shelf (COTS) online algorithm that generates the data set for each image 32 and 40.

Referring to FIGS. 1 and 2, first partition member 22 further includes a first plurality of fiducial markers 50. Fiducial markers 50 are arranged in a predetermined pattern. In an exemplary embodiment, fiducial markers 50 are arranged in an "X" pattern. In an exemplary embodiment, each fiducial marker 50 comprises a tungsten disc. However, the quantity, pattern and shape of the fiducials markers can be varied in other embodiments. For example, in some embodiments, fiducial markers 50 are arranged in columns and rows. Similarly, second partition member 24 further includes a second plurality of fiducial markers 60. Fiducial markers 60 are arranged in a predetermined pattern. In an exemplary embodiment, fiducial markers 60 are arranged in an "X" pattern. In an exemplary embodiment, each fiducial marker 60 comprises a tungsten disc. However, the quantity, pattern and shape of fiducials markers 60 can be varied in other embodiments. For example, in some embodiments, fiducial markers 60 are arranged in columns and rows.

Figure 14A:
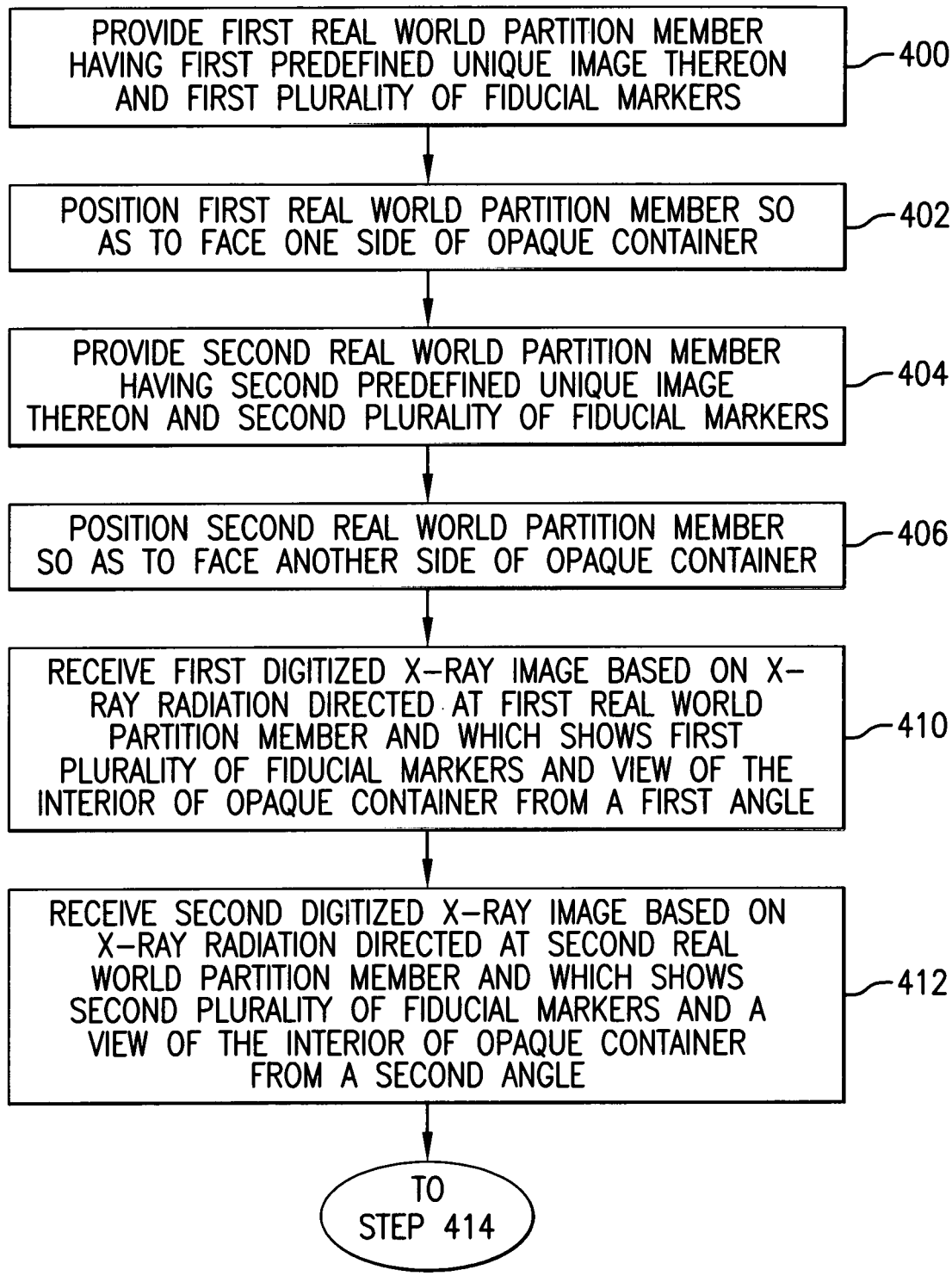
FIGS. 14A-F are flow diagrams illustrating a set of operations in accordance with an exemplary embodiment disclosed herein.

Referring to FIGS. 1 and 2, when frame 20 is positioned adjacent to the enclosed opaque container 12, frame 20 is opened so that first partition member 22 is perpendicular to second partition member 24 and first partition member 22 faces one side of enclosed opaque container 12 and second partition member 24 faces another side of enclosed, opaque container 12. This process is indicated by steps 400, 402, 404 and 406 in FIG. 14A. In some embodiments, first partition member 22 and the second partition member 24 are separate pieces and are not joined together. In such embodiments, first partition member 22 and the second partition member 24 are placed at different locations. In other embodiments, only first partition member 22 or second partition member 24 is used, but not both.

As used herein, first partition member 22 and second partition member 24 are referred to herein as "real world partition members" so as to distinguish the physical partition members from the virtual depictions of the partition members that are described in the ensuing description.

Figure 15:
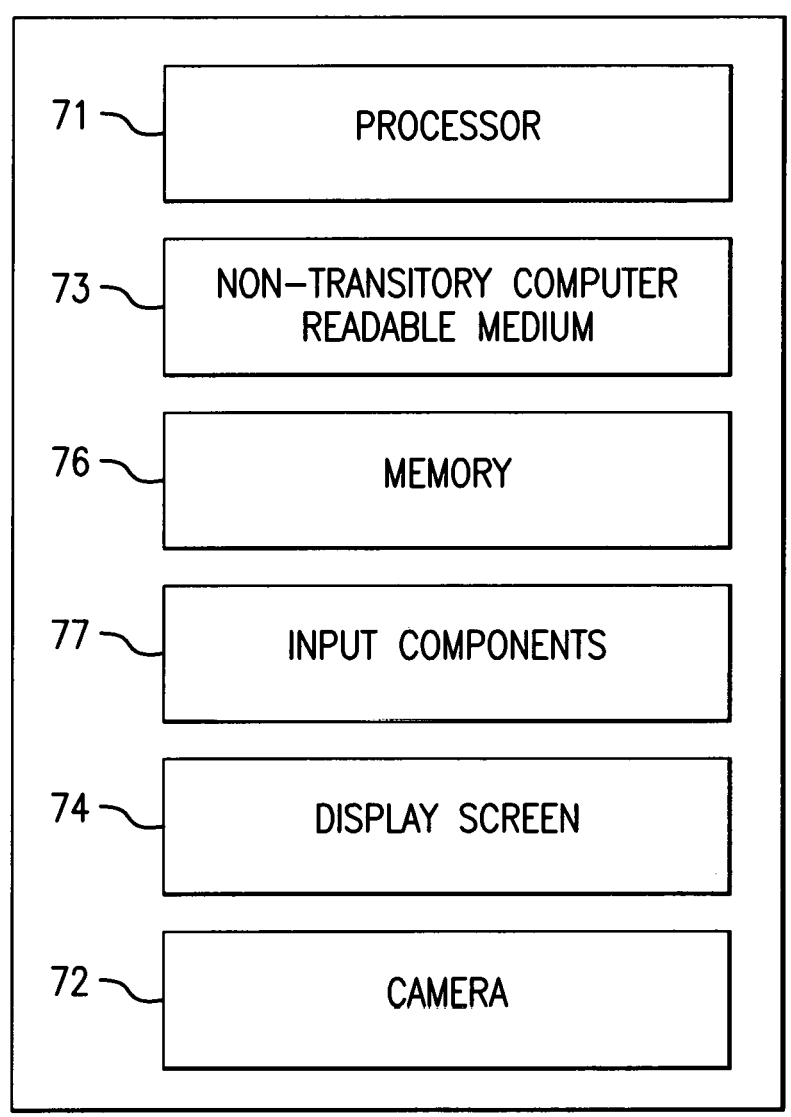
FIG. 15 is a block diagram of an exemplary computing device.

In an embodiment, the system disclosed herein includes an image recording device that is in electronic data signal communication with at least one processor. In an exemplary embodiment, the image recording device comprises a camera. In some embodiments, the image recording device and processor are separate components, such as a digital camera that is in electronic signal communication with a tablet computer or a desktop, laptop or notebook computer. In an exemplary embodiment, the image recording device and processor are combined into a single computing device. An embodiment of such a computing device is computing device 70, which is shown in FIG. 15. Computing device 70 includes at least one processor 71, camera or image recording device 72, non-transitory computer readable medium 73, display screen 74, memory 76 and at least one input component 77 for receiving data from or routing data to external devices. Non-transitory computer readable medium 73 stores machine-readable instructions that when executed by processor 71, cause the processor 71 to carry out the operations disclosed herein. Examples of suitable input components 77 are data ports, data connectors, USB ports, mini-USB ports, micro-USB ports, etc. In an exemplary embodiment, computing device 70 comprises a smart phone that is programmed with a software App that carries out the operations disclosed herein. For purposes of facilitating understanding of the system and method disclosed herein, computing device 70, in an exemplary embodiment, is referred to herein as smart phone 70 (see FIG. 4). Smart phone 70 includes home button 75 which is well known in the field of smart phones. Data representing or defining each predefined or unique image 32 and 40 is stored in memory 76 and eventually loaded into processor 71 for processing. As a result, processor 71 is programmed with real life measurements of every single line, dot and detail that appears in camouflage images 32 and 40.

Non-transitory computer readable medium 73 further includes instructions stored thereon which correspond to one or more programs including an Advanced Computer Vision (ACV) image processing algorithm that are executable by processor 71. The ACV image processing algorithm processes the image data of a live video feed provided by the camera 72. The ACV algorithm utilizes the data sets of images 32 and 40 to determine if an image captured in the live video feed is the same as image 32 or image 40. As a result, smart phone 70 is capable of recognizing the predefined patterns of camouflage images 32 and 40.

The Advanced Computer Vision software processes the live feed from camera 72 and creates a virtual reality environment (or "virtual environment") with virtual depictions of the real world environment images 32 and 40. The virtual reality environment is based on a virtual environment coordinate system or world coordinate system. The Advanced Computer Vision software executed by processor 71 allows the user to define where everything will appear in the virtual reality environment. Therefore, the user may define the size of the virtual depictions of camouflage images 32 and 40. The user also may define or specify the location of the virtual depictions of camouflage images 32 and 40 with respect to the virtual environment coordinate system. In the virtual reality environment, the virtual depictions of camouflage images 32 and 40 are positioned in the same way as images 32 and 40 are positioned in the real world environment. Specifically, the virtual camouflage images 32 and 40 are joined to each other to form the same corner and are angulated about 900 apart just as they are in the real world environment. The fiducial markers 50 and 60 are visible in the virtual depictions of camouflage images 32 and 40, respectively, and are depicted as colored icons that are in the shape of buttons or discs. This feature is described in detail in the ensuing description. The virtual depictions of camouflage image 32 and 40 may be viewed on display screen 74 one at a time, during the step of selecting a fiducial marker by touching the corresponding colored icon shown in the virtual reality description. Both virtual depictions of images 32 and 40 may be seen simultaneously during the steps of "Calibrating," "Finding Orthogonality" or "Aiming," which are all described in detail in the ensuing description.

As shown in FIG. 1, smart phone 70 is mounted on support structure 80, which has a plurality of leg members 82. In an exemplary embodiment, support structure 80 comprises a tripod. Support structure 80 is described in detail in the ensuing description.

As described in the foregoing description, opaque container 12 has interior region 13 within which is located suspect object 10 and other objects 14 and 15. Suspect object 10 may be a bottle, box, carton, etc. that may hold explosive material or other energetic device. In order to obtain a view of the contents of opaque container 12, x-rays are taken of enclosed opaque container 12 from two different angles. As shown in FIG. 1, first x-ray machine 100 is positioned so that it faces first real world partition member 22 and first real world partition member 22 is between x-ray machine 100 and enclosed opaque container 12. As a result of this configuration, x-ray radiation emitted by x-ray machine 100 is directed to first side 28 of first real world partition member 22. First x-ray film 102 is positioned on the opposite side of opaque container 12 such that opaque container 12 is positioned between first real world partition member 22 and first x-ray film 102. In an exemplary embodiment, first x-ray film 102 is aligned with and substantially parallel to first real world partition member 22. Next, the first-x-ray is taken such that first x-ray radiation 104 passes through first real world partition member 22, opaque container 12 and first x-ray film 102. The plane of first x-ray radiation 104 is orthogonal to camouflage image 32 on first real world partition member 22. Since camouflage image 32 is made from a low-density material, first x-ray radiation 104 passes through camouflage image 32. As a result, camouflage image 32 does not appear on the first x-ray film 102. However, fiducial markers 50 of first real world partition member 22 and interior region 13 of opaque container 12, as seen from that angle, do appear on the first x-ray film 102. The image of first x-ray film 102 is scanned via digital scanner 106 so as to digitize the image on x-ray film 102 thereby producing a first digitized x-ray image. In an exemplary embodiment, digital scanner 106 is in electronic data signal communication with computing device 70 via input components 77 and USB cable 107. In other embodiments, digital scanner 106 is in electronic data signal communication with computing device 70 via wireless connections or networks. The first digitized x-ray image is then imported into memory 76 (e.g. ROM, RAM, etc.). In an exemplary embodiment, the first digitized x-ray image is in the form of a JPEG image when it is imported into memory 76. As will be described in the ensuing description, the first digitized x-ray image is routed from memory 76 to processor 71 for processing. This is indicated by step 410 in FIG. 14A.

As shown in FIG. 1, second x-ray machine 120 is positioned so that it faces the first side 36 of second real world partition member 24 of frame 20 and second real world partition member 24 is between x-ray machine 120 and opaque container 12. As a result of this configuration, the x-ray radiation 122 emitted by x-ray machine 120 is directed to first side 36 of second real world partition member 24. Second x-ray film 124 is positioned on the opposite side of opaque container 12 such that opaque container 12 is between second real world partition member 24 and second x-ray film 124. In an exemplary embodiment, second x-ray film 124 is aligned with and substantially parallel to second real world partition member 24. Next, the second x-ray is taken such that second x-ray radiation 122 passes through second real world partition member 24, opaque container 12 and second x-ray film 124. The plane of second x-ray radiation 122 is orthogonal to camouflage image 40 on second real world partition member 24. Since camouflage image 40 is made from a low-density material, second x-ray radiation 122 passes through camouflage image 40. As a result, camouflage image 40 does not appear on second x-ray film 124. However, fiducial markers 60 of second real world partition member 24 and interior 13 of opaque container 12, as seen from that angle, do appear on second x-ray film 124. Second x-ray film 124 is digitally scanned with digital scanner 106 to generate a second digitized x-ray image which is imported into memory 76. In an exemplary embodiment, the digitized image of second x-ray film 124 is in the form of a JPEG image when it is imported into memory 76. As will be described in the ensuing description, the second digitized x-ray image is routed from memory 76 to processor 71 for processing. This step is indicated by step 412 in FIG. 14A.

In another exemplary embodiment, a single x-ray machine is used. In such an embodiment, the x-ray machine is first set up so that the first x-ray radiation passes through first real world partition member 22 and opaque container 12 as described in the ensuing description. After the first x-ray is taken, the x-ray machine is re-positioned and set up so that the second x-ray radiation passes through the second real world partition member 24 and opaque container 12.

Figure 3:
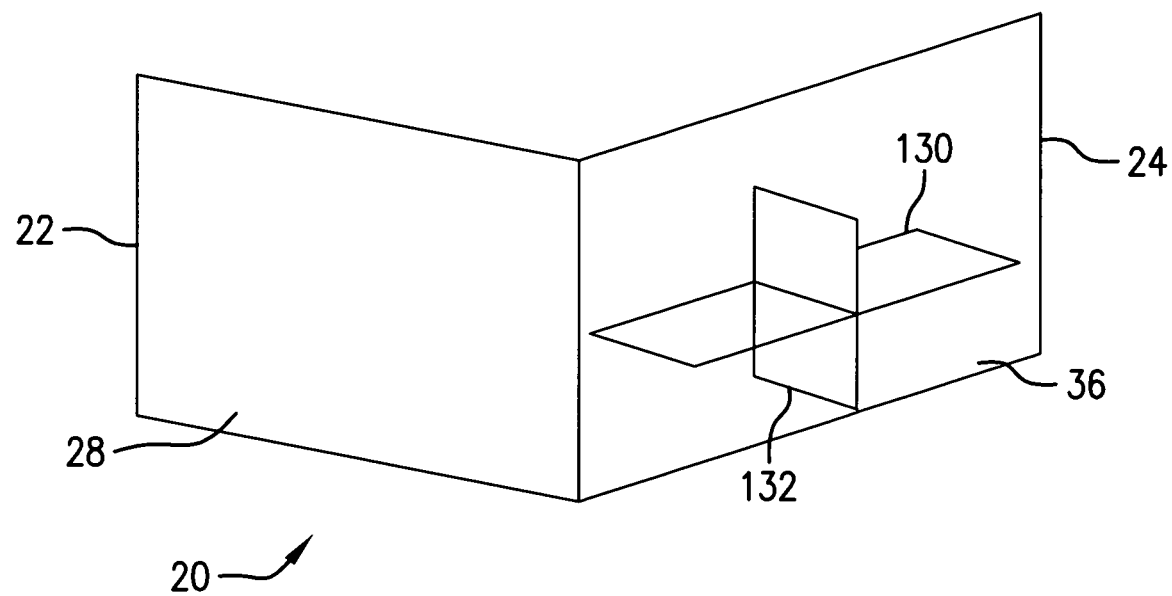
FIG. 3 is a diagram illustrating the determination of orthogonality of x-ray radiation directed at each partition member of the collapsible frame.

In an exemplary embodiment, first real world partition member 22 is substantially perpendicular to second real world partition member 24. In such a case, the method implements an "Orthogonality Mode" in order to locate the position of x-ray machine 100 and x-ray machine 120 with respect to first real world partition member 22 and second real world partition member 24, respectively. Orthogonality is found or determined with a combination of virtual reality and augmented reality. Non-transitory computer readable medium 73 includes machine-readable instructions that, when executed by processor 71, cause processor 71 to determine orthogonality. Referring to FIG. 3, in order to establish orthogonality, the Advanced Computer Vision (CV) software executed by processor 71 displays on display screen 74 an intersecting horizontal plane 130 and vertical plane 132 that are always perpendicular to each other and are adjacent to first real world partition member 22 or second real world partition member 24. For example, as shown in FIG. 3, horizontal plane 130 and vertical plane 132 are adjacent to first side 36 of second real world partition member 24 and intersect at the point where the axis of x-ray radiation 122 meets first side 36. This configuration provides the user with a qualitative and intuitive indicator for orthogonality between the x-ray radiation and the partition member of interest (i.e. first real world partition member 22 or second real world partition member 24) as these intersecting planes 130 and 132 may be observed from the viewpoint of the x-ray machine 100 or x-ray machine 120. In order to accurately determine orthogonality, processor 71 carries out a "Calibration Mode" operation. The Calibration Mode is described in detail in the ensuing description. The software executed by processor 71 also causes display screen 74 to display "standoff distance" and a value referred to as "orthogonality factor," which is related to the "dot product" between a partition member's normal vector and the vector aligned with the axis of the x-ray radiation. This information aids in quantifying orthogonality. Full orthogonality is achieved when the value equals "1". In some embodiments, the Calibration Mode is implemented prior to finding "orthogonality". Once the Calibration Mode has been implemented, it does not have to be implemented again during processing of the first x-ray image and the second x-ray image. For purposes of brevity and to facilitate understanding of the Orthogonality Mode, the ensuing description is in terms of the Calibration Mode having already been completed.

The beams of x-ray radiation 104 and 122 must be as orthogonal as possible to the surface of camouflage images 32 and 40, respectively, in order to achieve a high level of fidelity. During the Orthogonality Mode, live feed videos of first real world partition member 22 and second real world partition member 24 are routed to processor 71. The Advanced Computer Vision (CV) software executed by processor 71 includes an algorithm that "sees" the intersection of the planes of first real world partition member 22 and second real world partition member 24 assuming camera 72 is not orthogonal to either first real world partition member 22 or second real world partition member 24. Since camouflage images 32 and 40 are pre-defined as described in the foregoing description, the ACV software recognizes both camouflage images 32 and 40 simultaneously.

In some situations, finding orthogonality may not be necessary. The need to find orthogonality depends upon the user's assessment of the type of opaque container 12 or the object of interest 10 within opaque container 12.

Figure 14B:
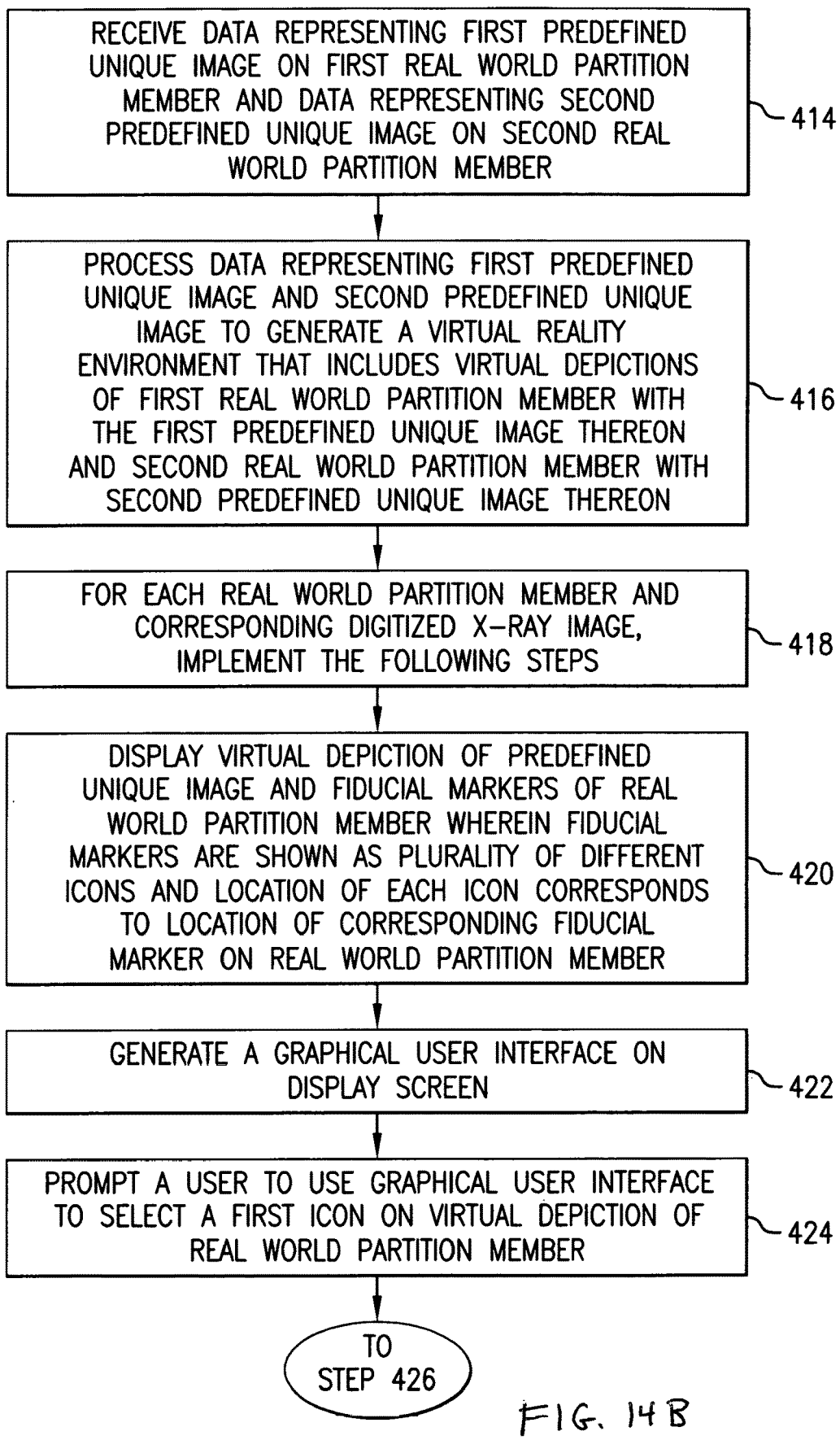

The data representing or defining first predefined unique image 32 of first real world partition member 22 and data representing or defining second predefined unique image 40 of second real world partition member 24 are loaded into processor 71. This process is indicated by step 414 in FIG. 14B.

Figure 4:
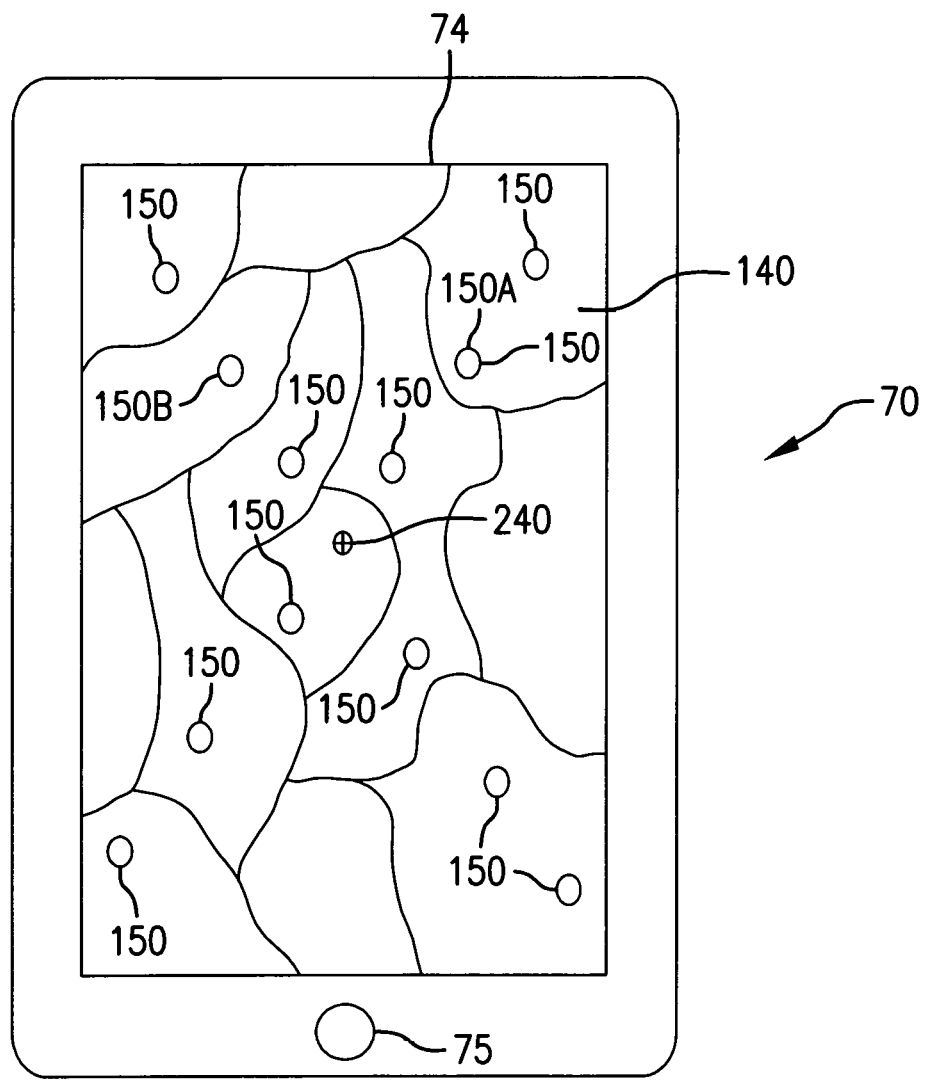
FIG. 4 is a view of smart phone displaying a virtual depiction of the predefined unique image and plurality of fiducial markers of a first one of the partition members shown in FIG. 2.

Each x-ray image is selected one at a time for processing. Processing each x-ray image includes scaling, positioning and orienting the x-ray image. The order in which the x-ray images are processed does not matter. For example, the first x-ray image derived from x-ray film 102 may be processed first and the second x-ray image derived from x-ray film 124, or vice versa. Before any processing of x-ray images occurs, an x-ray image must be selected. Processor 71 implements an "X-Ray Selection Mode" which utilizes a virtual reality environment. Display screen 74 displays a menu that lists several icons, one of which being "X-Ray Selection Mode". When the user presses the icon labelled "X-Ray Selection Mode," two additional icons appear on display screen 74. One of the additional icons corresponds to first real world partition member 22 and the other icon corresponds to second real world partition member 24. The user then touches one of these icons, and, in response, display screen 74 displays the x-ray image corresponding to the selected real world partition member of frame 20 along with an icon labelled as "Continue". Once the user touches the "Continue" icon, display screen 74 displays a virtual depiction of the camouflage image corresponding to the selected real world partition member of frame 20. Processor 71 processes the data representing or defining first predefined unique image 32 of first real world partition member 22 and processes the data representing or defining second predefined unique image 40 of second real world partition member 24 to generate the virtual depictions of the camouflage images 32 and 40. This process is indicated by step 416 in FIG. 14B. In the virtual depiction of each camouflage image, the fiducial markers (e.g. tungsten discs) are depicted as different colored icons. The location of each colored icon in the virtual depiction corresponds to the actual location of a corresponding fiducial marker (e.g. tungsten disc) on the real world camouflage image of the selected real world partition member of frame 20. This process is illustrated in FIG. 4. As described in the foregoing description, first real world partition member 22 has camouflage image 32 and fiducial markers 50. Processor 71 causes display screen 74 to display virtual depiction 140 of the camouflage image 32 and also displays a plurality of different colored circular icons 150 that represent fiducial markers 50 in first real world partition member 22. This process is indicated by steps 418 and 420 in FIG. 14B. The location of each icon 150 corresponds to an actual location of a corresponding fiducial marker 50 in the first real world partition member 22. For example, icon 150A corresponds to real world fiducial marker 50A (see FIG. 2) in first real world partition member 22 and icon 150B corresponds to real world fiducial marker 50B in first real world partition member 22. Although the foregoing description is in terms of colored icons 150 being circular in shape, it is to be understood that icons 150 may have other shapes, e.g. square, oval, triangular, rectangular, etc.

Figure 5A:
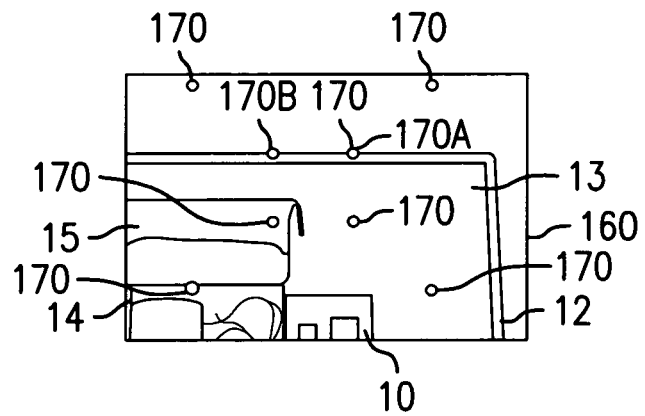
FIG. 5A is a diagrammatical representation of an x-ray image resulting from x-ray radiation passing through a first one of the partition members and the opaque container.
Figure 5B:
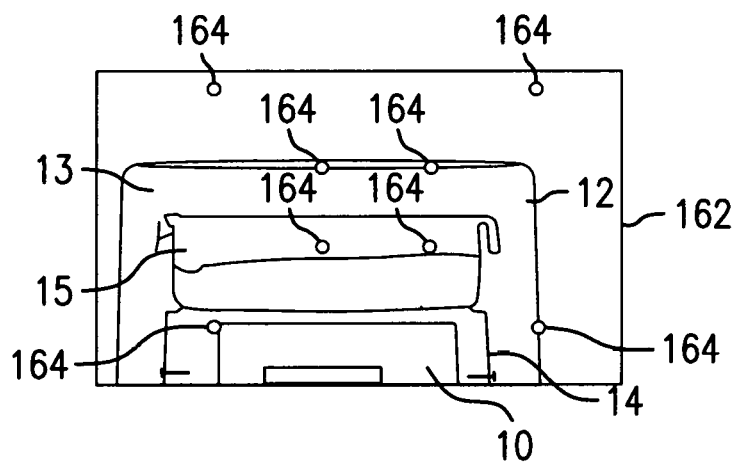
FIG. 5B is a diagrammatical representation of an x-ray image resulting from x-ray radiation passing through a second one of the partition members and the opaque container.

Referring to FIG. 5A, there is shown x-ray image 160 resulting from x-rays passing through first real world partition member 22 and opaque container 12. Fiducial markers 50 on first real world partition member 22 are shown as fiducial marker images 170 in x-ray image 160. Therefore, each fiducial image 170 corresponds to a fiducial marker 50 on real world partition member 22. X-ray image 160 shows objects 10, 14 and 15 from a first angle. Objects 10, 14 and 15 are located within interior 13 of opaque container 12. Object 15 is sitting on top of object 14 as described in the foregoing description and shown in FIG. 1. FIG. 5B shows x-ray image 162 resulting from x-rays passing through second real world partition member 24 and opaque container 12. Fiducial markers 60 on second real world partition member 24 are shown as fiducial marker images 164 in x-ray image 162. X-ray image 162 shows objects 10, 14 and 15 from a second angle.

Figure 6:
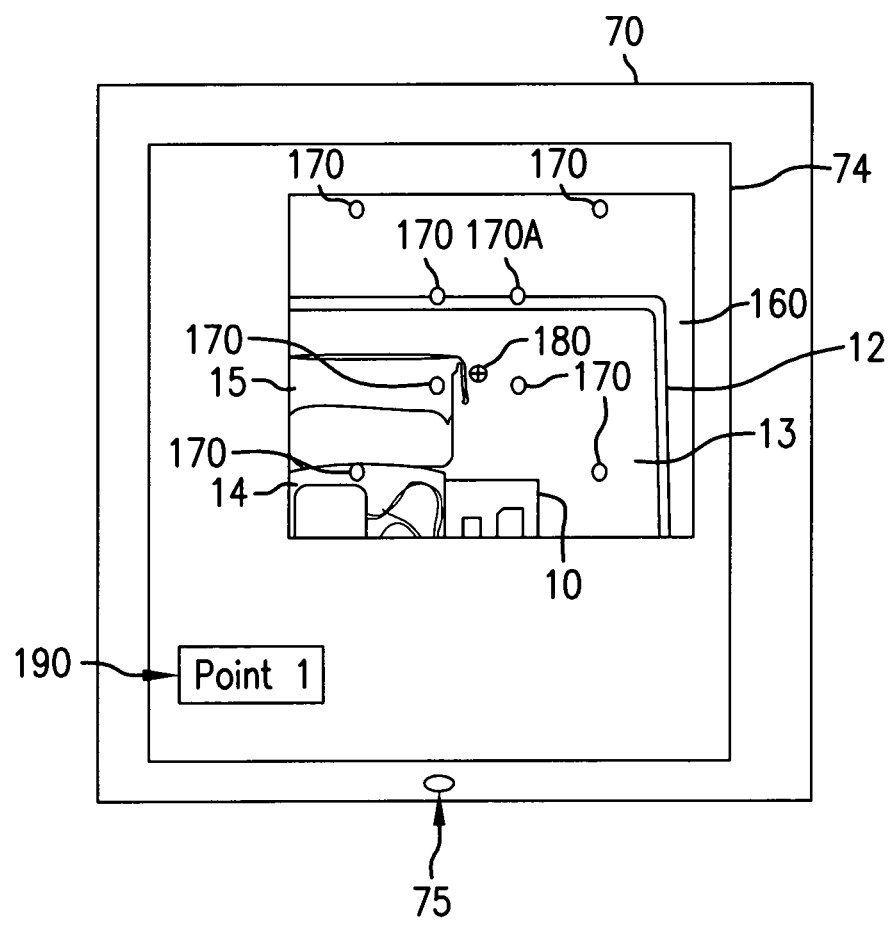
FIG. 6 is a diagram illustrating the x-ray image of FIG. 5A being displayed on a display screen of a smart phone.
Figure 7:
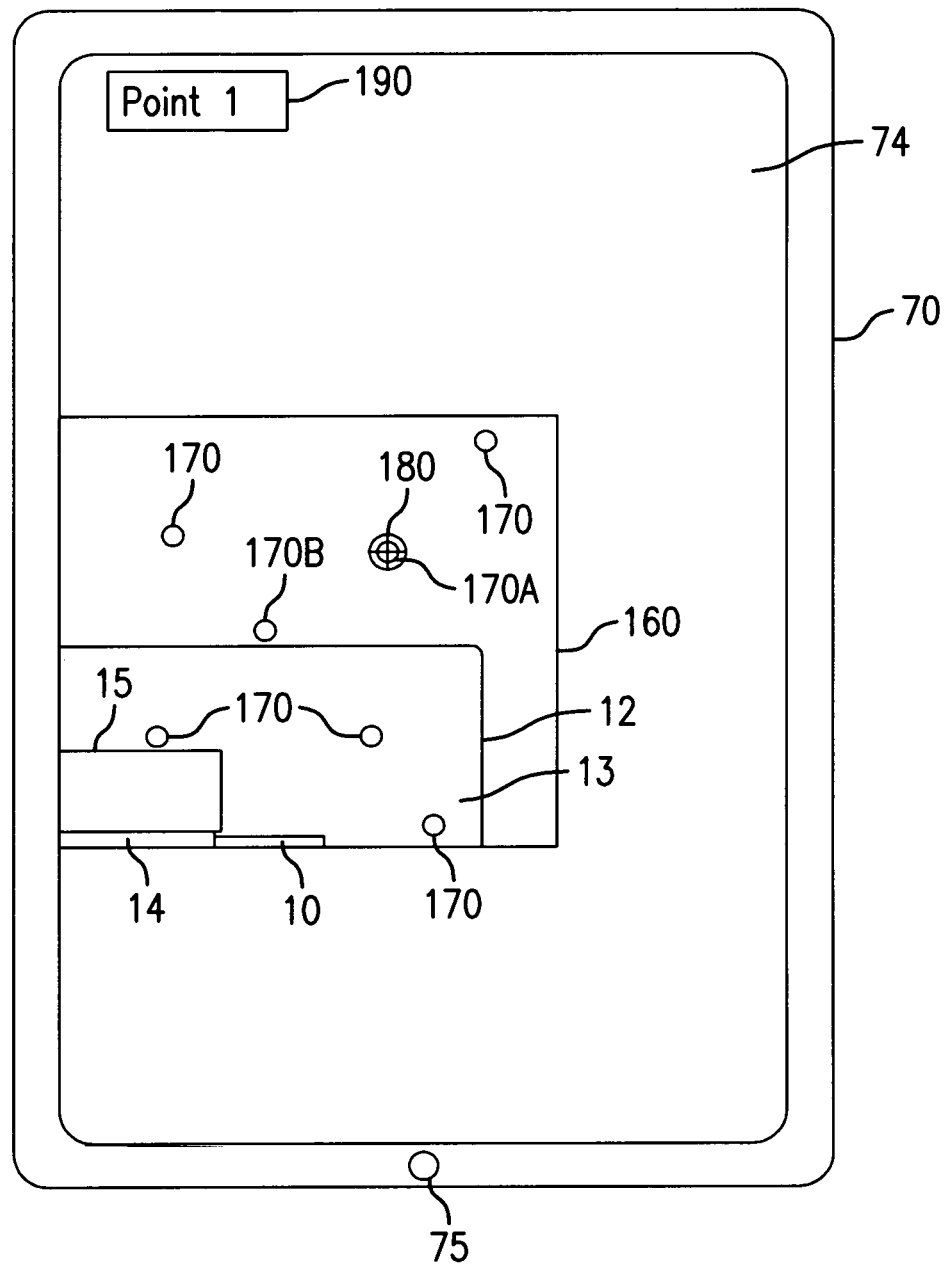
FIG. 7 is a diagram illustrating the x-ray image, shown in FIG. 6, after being dragged to a first location on the display screen so as to map a fiducial marker on the x-ray image with a fiducial marker on the virtual depiction shown in FIG. 4 in order to determine a first point that is to be used in scaling and positioning the x-ray image.
Figure 8:
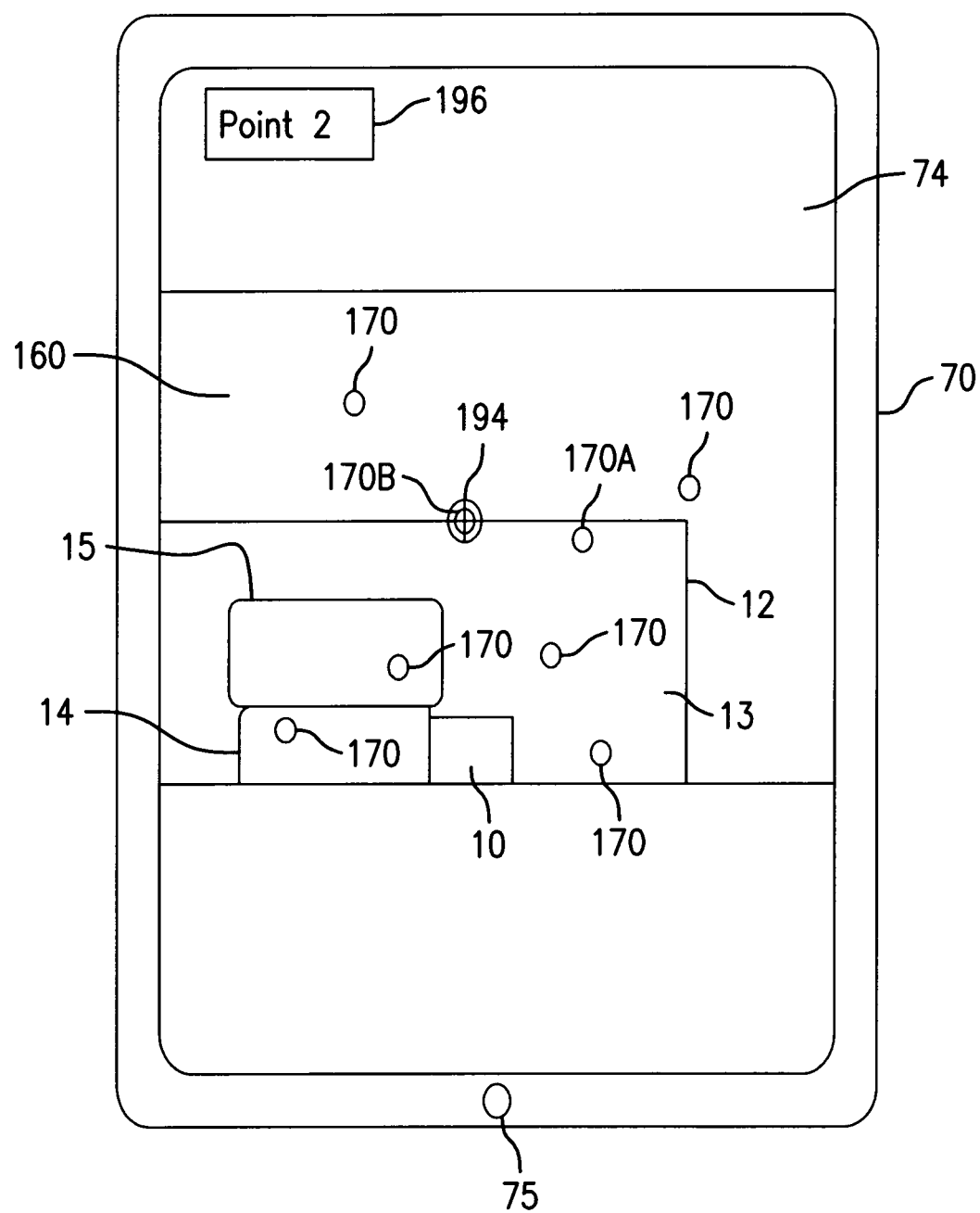
FIG. 8 is a diagram illustrating the x-ray image, shown in FIG. 6, after being dragged to a second location on the display screen so as to map a fiducial marker on the x-ray image with a fiducial marker on the virtual depiction shown in FIG. 4 in order to determine a second point that is to be used in scaling and positioning the x-ray image.
Figure 14C:
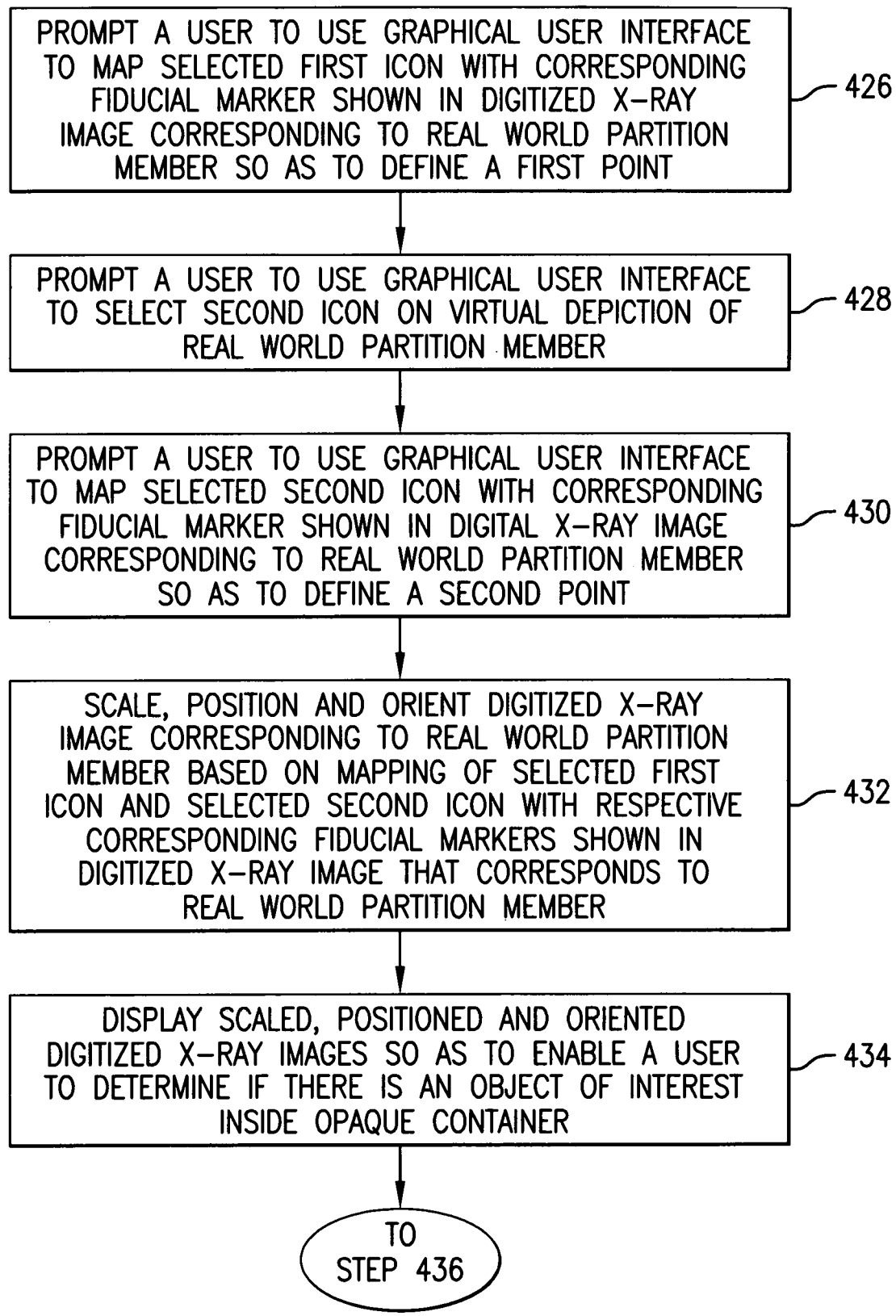

The next step is to scale and position each x-ray image 160 and 162. Processor 71 causes the generation of a graphical user interface on display screen 74 for this purpose. This process is indicated by step 422 in FIG. 14B. For purposes of describing this aspect of the invention, x-ray image 160 will be scaled and positioned first. Therefore, the first step is to map two of the colored icons 150 shown in virtual depiction 140 (see FIG. 4) with two of corresponding fiducial marker images 170 in corresponding x-ray image 160 (see FIG. 5A). In order to accomplish the mapping step, the user uses the graphical user interface on display screen 74 to press, swipe, click or touch one of the colored icons 150 in virtual depiction 140. This process is indicated by step 424 in FIG. 14B. Once one of the colored icons is selected, display screen 74 displays x-ray image 160, a crosshair 180 having the same color as the selected colored icon, and icon 190 labelled "Point 1" as shown in FIG. 6. Crosshair 180 is positioned in the center of display screen 74 and remains stationary in the center of display screen 74. Crosshair 180 is not part of x-ray image 160. For example, referring to FIG. 4, icon 150A is colored blue and corresponds to fiducial marker images 170A shown in FIGS. 5A and 6. If the user touches blue colored icon 150A in FIG. 4, then display element 74 displays x-ray image 160 as shown in FIG. 6 wherein crosshair 180 is colored blue. The user drags x-ray image 160 so that fiducial marker image 170A is aligned with the center of crosshair 180 as shown in FIG. 7. This process is illustrated in step 426 in FIG. 14C. Since the x-ray image 160 was dragged in a downward, diagonal direction (i.e. downward and to the left), portions of objects 10, 14 and 15 are off the display screen 74. The user may enlarge or decrease the size of the view of x-ray image 160 in order to facilitate alignment of fiducial marker image 170A with the center of crosshair 180. When the user believes the alignment is as accurate as possible, the user touches the "Point 1" icon 190. Touching the "Point 1" icon 190 correlates or maps colored icon 150A to fiducial marker image 170A on x-ray image 160. This process is illustrated in step 426 in FIG. 14C. After the user touches the "Point 1" icon 190, display screen 74 once again displays the virtual depiction 140 of the camouflage image 32 with the colored circular icons 150 (see FIG. 4). The user must select another one of the colored icons 150 shown in FIG. 4. This is illustrated in step 428 in FIG. 14C. However, the user cannot select a colored icon 150 that has the same color as the previously selected colored icon 150A. The user must select a colored icon 150 that has a different color. In this example, the user selects red colored icon 150B shown in FIG. 4, which corresponds to fiducial marker image 170B on x-ray image 160 shown in FIG. 5B. Once the user touches the second colored icon 150B in FIG. 4, display screen 74 shows x-ray image 160, crosshair 194, which is also colored red, and "POINT 2" icon 196. The user then drags x-ray image 160 so as to align corresponding fiducial marker 170B with the center of crosshair 194 as shown in FIG. 8. When the user believes the alignment is as accurate as possible, the user touches icon 196 labelled as "Point 2". Touching the "Point 2" icon 196 correlates or maps colored icon 150B in FIG. 4 to fiducial marker image 170B on x-ray image 160. This process is illustrated by step 430 in FIG. 14C. X-ray image 160 is automatically scaled, positioned and oriented thereby completing the correlation or mapping process for one of the partition members of frame 20. This process is illustrated by step 432 in FIG. 14C. In an exemplary embodiment, the scaling, positioning orientation of x-ray image 160 takes place in the background while display screen 74 once again displays the virtual depiction 140 of the camouflage image of the selected partition member of frame 20. However, when virtual depiction 140 reappears on display screen 74, colored circular icons 150 are not shown because the mapping process for this selected partition member of frame 20 is now complete. At this time, display screen 74 also displays the menu icon and two icons that allow the user to select either first real world partition member 22 or second real world partition member 24. Next, the user will press the icon corresponding to the real world partition member of frame 20 that was not previously selected so that this partition member can undergo the mapping, scaling and positioning processes as described in the foregoing description and indicated by steps 426-432 in FIG. 14C. Since x-ray image 160 has now undergone the mapping, scaling and positioning processes, the user will now select second real world partition member 24 so that x-ray image 162 will undergo the mapping, scaling and positioning steps. However, the user may repeat the process for first real world partition member 22 if the user believes an error was made during the scaling, positioning and orienting processes performed on x-ray image 160.

In some embodiments, the user measures the distance between first real world partition member 22 and first x-ray film 102 and the distance between second real world partition member 24 and second x-ray film 124 and then enters those measured distances into the processor 71 via the graphical user interface displayed on display screen 74. The measurements can be taken manually, via a measuring tape, yard stick, etc.

Figure 14D:
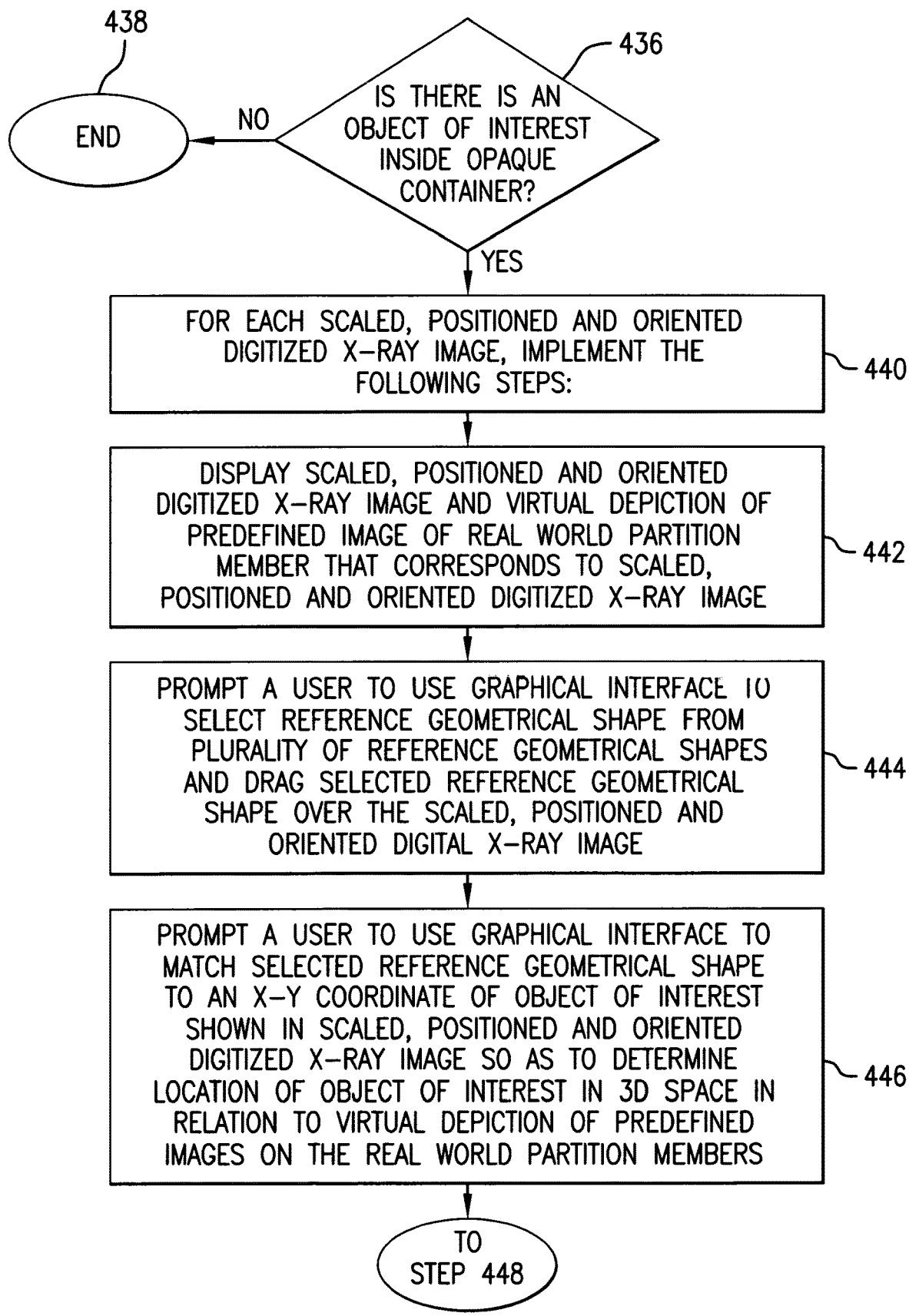

The method then implements a series of steps that are referred to as the "Build Mode". In the "Build Mode," x-ray images 160 and 162 are displayed on display screen 74 in order to allow the user to review to find any object in opaque container 12 that appears suspicious or warrants further examination (i.e. an "object of interest"). This process is indicated by step 434. The user must decide whether there is an object of interest in opaque container 12. This process is indicated by step 436 in FIG. 14D. If no item in opaque container 12 is considered to be an object of interest that warrants further examination, then the method is terminated as indicated by step 438 in FIG. 14D. However, if there is an item in opaque container 12 that is considered to be an object of interest, then the next step is to trace the object of interest and determine where it is located in 3-D space. This process is indicated by steps 440, 442 and 444 in FIG. 14D. For example, if object 10 (see FIG. 1) is the object of interest, then it is necessary to trace object 10 and determine where it is located in 3-D space. In order to accomplish these steps, the Build Mode utilizes a virtual reality setting. Display screen 74 displays the Menu icon, a second icon labelled "Shapes", a third icon labelled "Functionality" and a fourth icon labelled "Colors". If the "Shape" icon is pressed, then a plurality of icons appear on the screen, where each icon indicates a particular geometrical shape, e.g. cuboids, cylinders, spheres, sphero-cylinders, etc. A library of such geometrical shapes or objects is stored in the memory in the smart phone 70. In order to insert a geometrical shape into the x-ray image on display screen 74, the user touches the icon with the desired shape and then drags the shape to a desired location on the x-ray image. Similarly, if the "Functionality" icon is pressed, then a plurality of function icons appears on display screen 74, where each icon indicates a particular function. For example, each function icon indicates a particular function such as changing the position, orientation and scale of any of the shapes dragged into the displayed x-ray image. An additional function icon allows the user to delete any of the shapes that have been dragged onto the displayed view of the x-ray image. Since the user can only view one x-ray image at a time, the function icons include a "Change Image" button that allows the user to view the other x-ray image corresponding to the other real world partition member of frame 20. If the "Colors" icon is touched, then a plurality of icons appears on the display screen, where each icon indicates a particular color. The color icons allow the user to colorize any of the shapes that are dragged over the x-ray image. There is no limit on the amount of shapes a user can introduce into the x-ray image displayed by display screen 74. In order for the user to interact with any one shape that has been introduced onto the x-ray image displayed by display screen 74, the user must first select that shape using the appropriate icon. After the user selects that shape, the user can move, scale, rotate or change the color of the shape. The user can also delete the shape.

Next, the user must trace suspicious object 10 (hereinafter referred to as "target 10"). The user presses the "Shapes" icon and presses an icon that corresponds to a desired geometrical shape. As a result, the desired geometrical shape appears on display screen 74 and the user drags the selected geometrical shape over to target 10. The user attempts to match one of the shapes to an X-Y coordinate of target 10. This process is indicated by step 446 in FIG. 14D. Using the functionality icons, the user scales, positions or rotates the shapes as needed. Once the user has finished these steps for the first x-ray image (e.g. x-ray image 160), the user then uses the appropriate functionality icon to change the view on display screen 74 to that of the second X-ray image (e.g. x-ray image 162). The user locates target 10 in the second x-ray image and then attempts to match the geometrical shapes to an X-Y coordinate of target 10. Once these steps are completed for the second x-ray image, target 10 can now be located in 3D space in relation to the camouflage images in the virtual environment. As described in the foregoing description, each camouflage image is predefined and its location in the virtual environment is based on a predefined coordinate system. Specifically, the completion of these steps provides 3D vision of frame 20, interior 13 of opaque container 12 and the location of target 10 with respect to the camouflage images 32 and 40 on real world partition members 22 and 24, respectively. These steps are repeated for any other items inside opaque container 12 that are considered to be an object of interest.

Figure 9:
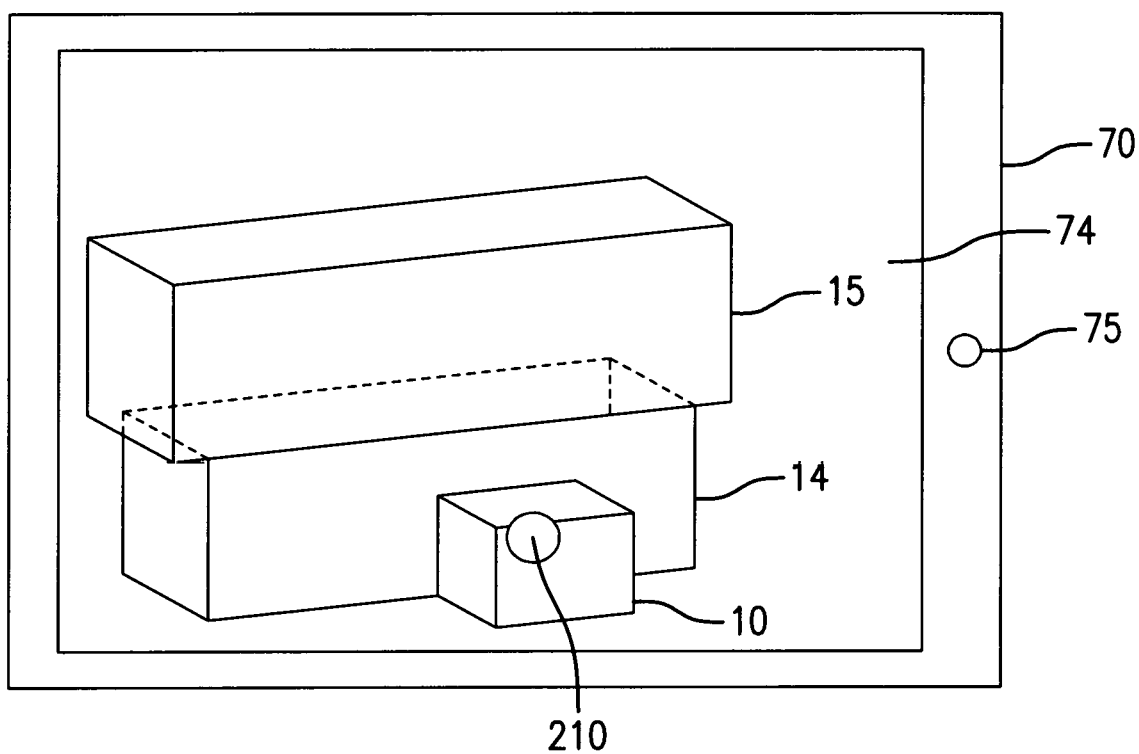
FIG. 9 is illustrates a virtual reality depiction of the interior of the opaque container being displayed on the display screen of the smart phone, the view showing a sphere positioned at the centroid of an object considered to be a suspicious or threatening object.

Display screen 74 displays the 3D image of the interior of opaque container 12. The 3D image shows the objects within the interior of opaque container 12, including target 10. The user uses his or her finger to touch the image of target 10 shown on display screen 74. Automatically, target 10 is colored with a predetermined color (e.g. green) and the non-selected objects within the interior of opaque container 12 are colored with different colors. In some embodiments, if any of the non-selected objects are considered a hazard, such objects are colored red, and any object that is neither a target nor a hazard, is colored with a third color, e.g. yellow. Processor 71 automatically generates a sphere at the centroid of target 10. This arrangement is illustrated in FIG. 9. Display screen 74 displays a virtual reality view through the "virtual camera" showing sphere 210 at the centroid of target 10. In this example, target 10 is colored green, sphere 210 is colored with a different color (e.g. blue), object 15 is colored with red to signify that it is a hazard and object 14 is colored yellow to signify that it is neither a hazard nor a target. The purpose of sphere 210 is to provide a visual aid when aiming disrupter device 200 at target 10 during the Aim Mode which is described in the ensuing description.

Disrupter device 200 is configured to propel or fire a substance or projectile at target 10 in order to destroy or disable target 10 while avoiding other objects in opaque container 12 such as objects 14 and 15. Disrupter device 200 can fire or propel such projectiles or substances. Such projectiles and substances include projectiles made from metal or other materials, cartridges that explode upon impact and pressurized fluids such as water. As shown in FIG. 1, disrupter device 200 is aimed at target 10 based on the information and data obtained by the steps described herein. Disrupter device 200 includes laser boresighter 204 (shown in phantom) that generates laser beam 206. In an exemplary embodiment, laser boresighter 204 is inserted or positioned within a bore of disrupter device 200. In an exemplary embodiment, smart phone 70 is also mounted to support structure 80 and is located adjacent to disrupter device 200. In actuality, disrupter device 200 is positioned a safe distance away from opaque container 12. In another exemplary embodiment, the process of determining orthogonality, as described in the foregoing description, may be implemented into order to find orthogonality between the flight path of a projectile that is to be fired by disrupter device 200 and target 10. In such an embodiment, the determination of orthogonality prevents the projectile from ricocheting inside opaque container 12.

The user now refers to the Menu wherein all of the Modes are listed. The two remaining modes are Calibration Mode and Aim Mode which are carried out by processor 71. In some embodiments, the Calibration Mode is implemented prior to finding orthogonality. As described in the foregoing description, the process of finding orthogonality may be implemented prior to taking x-rays. In some embodiments, the Calibration Mode is implemented prior to the Aim Mode. For example, if Calibration Mode was previously executed based on the location of x-ray machine 100 but x-ray machine 100 was subsequently replaced with disrupter device 200, then Calibration Mode may have to be implemented again because the location from where the x-ray beam was emitted may be different than the location from where the projectile will be fired.

As shown in FIG. 10, each real world partition member 22 and 24 of frame 20 has a center point represented by a small circle and a cross-hair symbol superimposed over the small circle. The intersection of the two lines that form the cross-hair defines the center point of the real world partition member. The center point of the real world partition member is also the center of the corresponding camouflage image on the real world partition member. For example, first real world partition member 22 has center point 220 that is defined by a circle crosshair symbol. Center point 220 functions as a known location on first real world partition member 22 to which the user can direct laser beam 206. Similarly, second real world partition member 24 has center point 230, which is defined by another circle and crosshair symbol. Center point 230 has the same function as center point 220 of first real world partition member 22. The location of center points 220 and 230 is already known because camouflage images 32 and 40 are predefined and recognizable by the ACV software executed by processor 71. Thus, center points 220 and 230 are represented by corresponding symbols on the virtual depictions of the camouflage images. For example, crosshair symbol 220 is represented as center point 240 in the virtual depiction shown in FIG. 4.

Figure 14E:
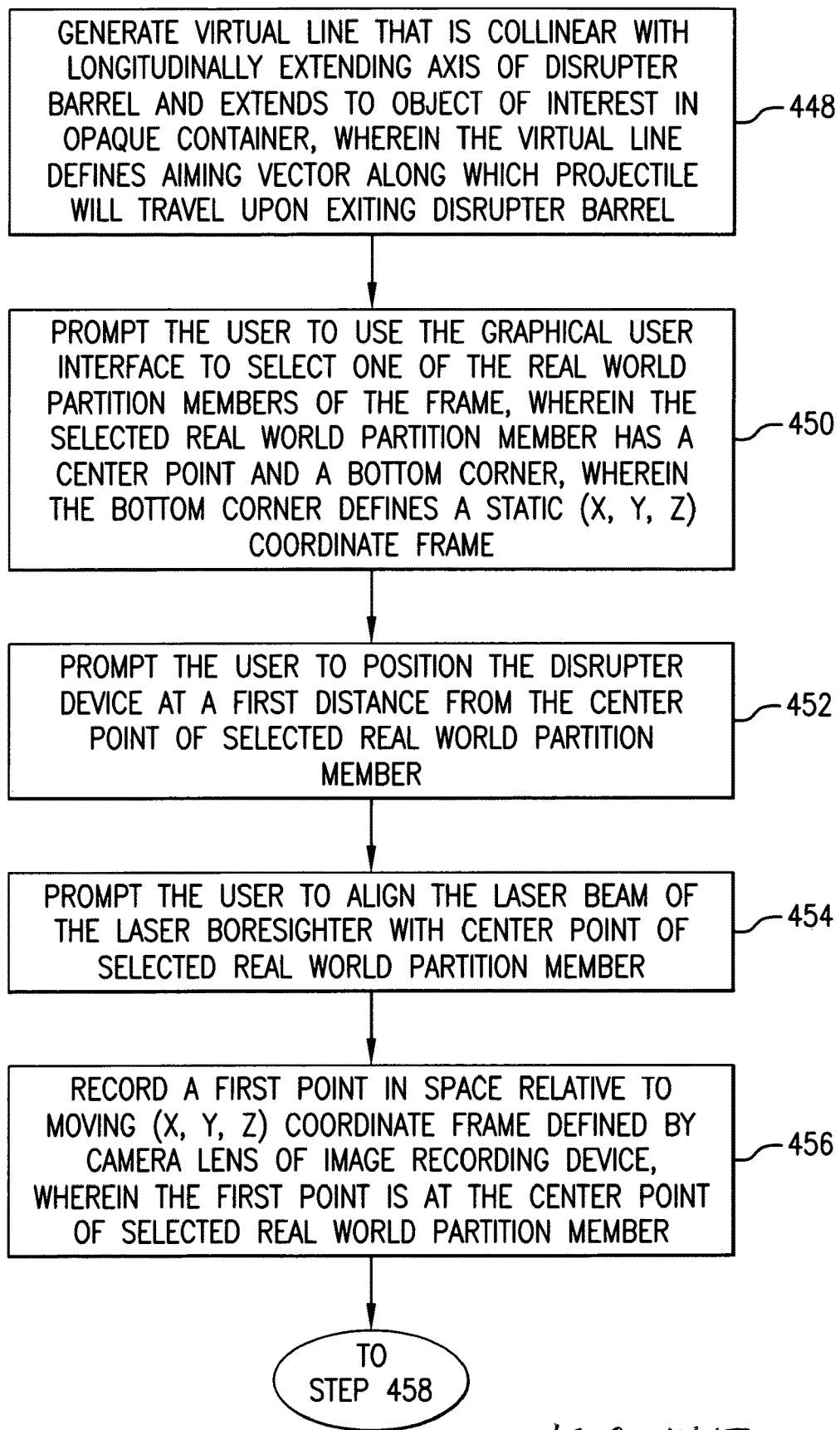

When Calibration Mode is selected, a "Live Feed" seen by camera 72 of smart phone 70 is displayed on display screen 74. The Calibration Mode determines two points in space, Point 1 and Point 2, that are defined by (X, Y, Z) coordinates and which define a virtual line. This virtual line defines an aiming vector that is used in the Aim Mode which is described in the ensuing description. This configuration is indicated by step 448 in FIG. 14E. In order to define the two points in space, two (X, Y, Z) coordinate frames are used. One (X, Y, Z) coordinate frame is moving (X, Y, Z) coordinate frame 270, the origin of which being the center of the lens of camera 72 (i.e. the image recording device). The other (X, Y, Z) coordinate frame is static (X, Y, Z) coordinate frame 272, the origin of which is at the bottom corner the selected real world partition member. This process is indicated by step 450 in FIG. 14E. For example, in FIG. 10A, static (X, Y, Z) coordinate frame 272 is at bottom corner of 274 of first real world partition member 22. The two (X, Y, Z) coordinates that define the virtual line belong directly to moving (X, Y, Z) coordinate frame 270 because these two (X, Y, Z) coordinates are fixed with respect to camera 72 and will go wherever camera 72 goes. Stated another way, after the Calibration Mode, the virtual line or aiming vector, which is represented by the two (X, Y, Z) coordinates in the moving (X, Y, Z) coordinate frame 270, moves with camera 72 wherever camera 72 goes. The virtual line or aiming vector is not fixed to center point 220 on first real world partition member 22.

Figure 10A:
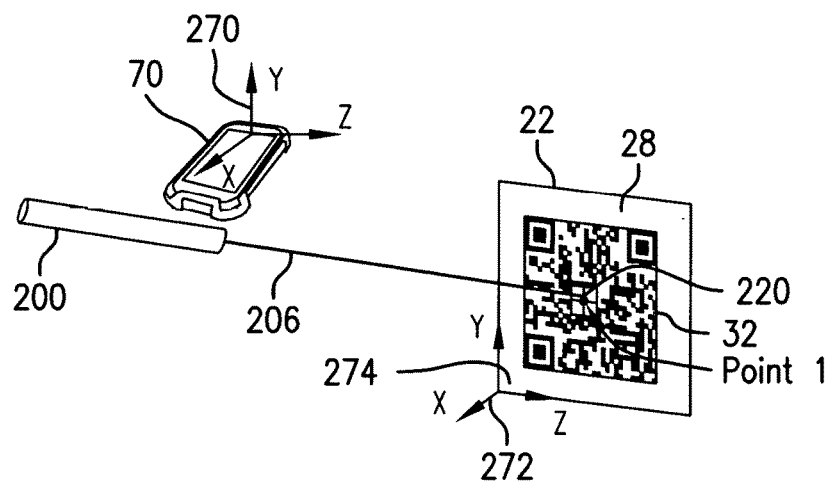
FIG. 10A is a diagram illustrating a first step in a calibration mode for determining a first point on a virtual line.
Figure 10B:
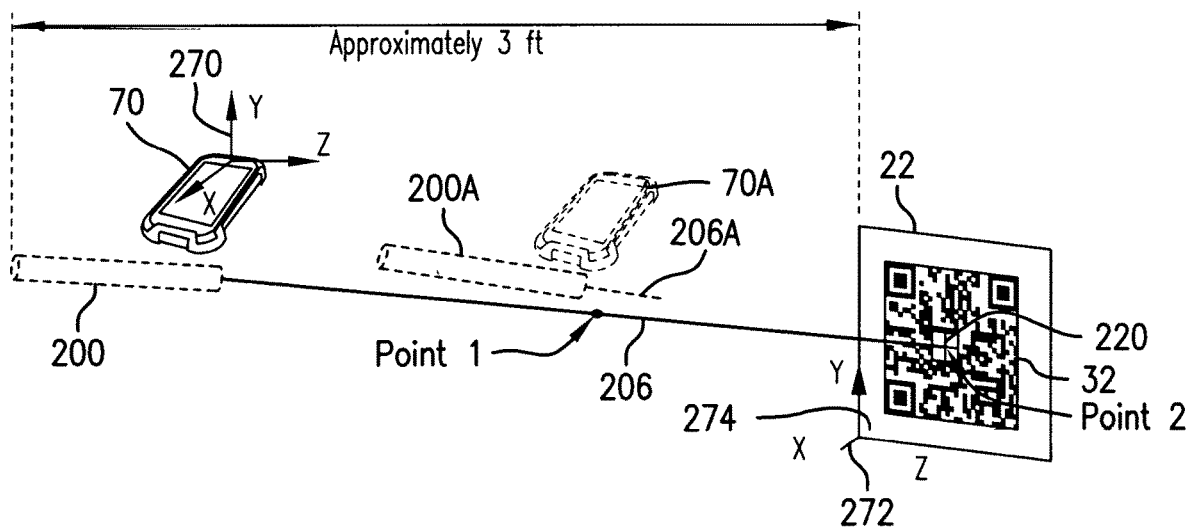
FIG. 10B is a diagram illustrating a second step in the calibration mode for determining a second point on the virtual line.
Figure 14F:
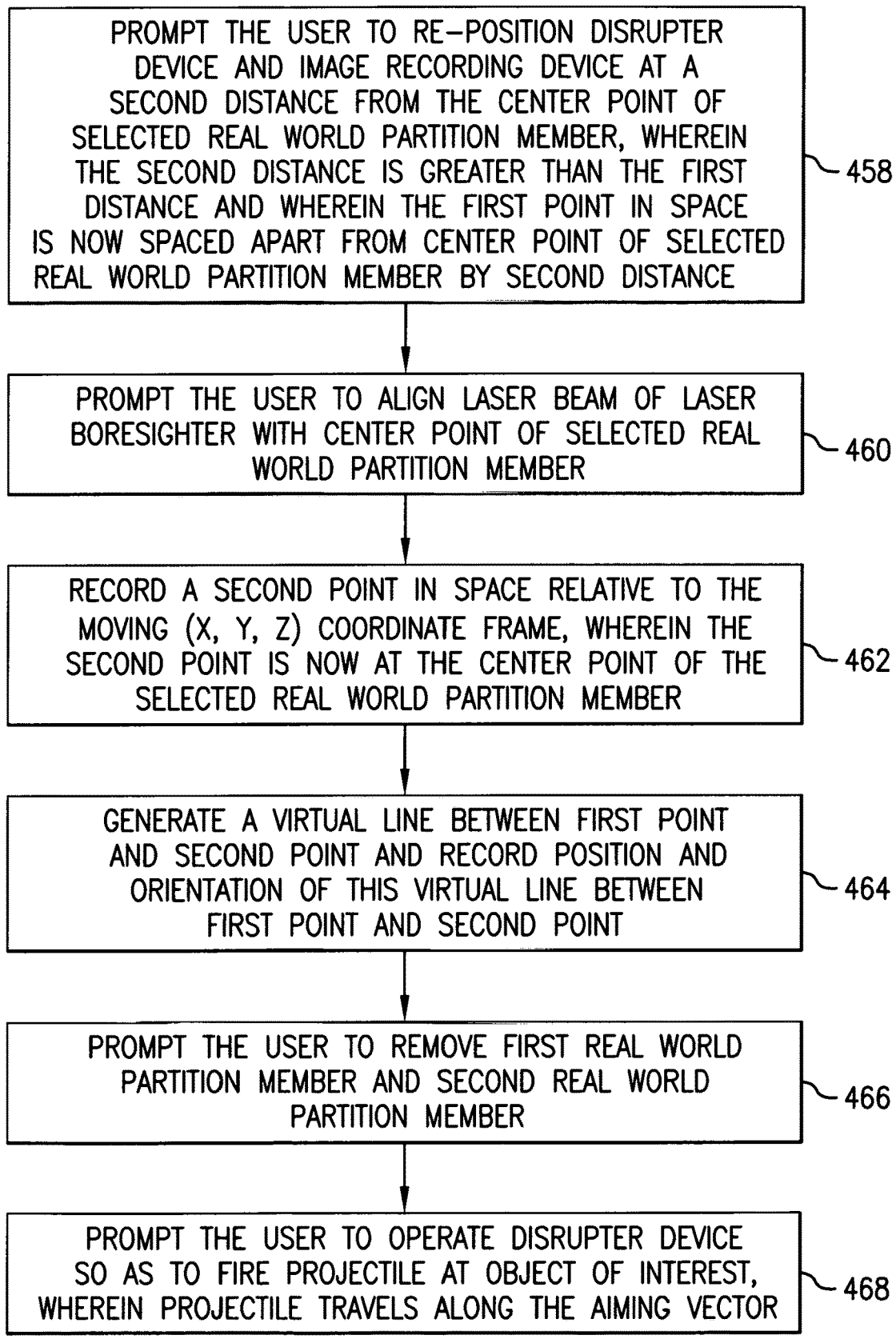

Referring to FIG. 10A, the first step in the Calibration Mode is to select either camouflage image 32 or camouflage 40. The user must use the same camouflage image in the determination of both (X, Y, Z) coordinates. In order to facilitate understanding of the Calibration Mode, the ensuing description is in terms of the user selecting camouflage image 32 on first real world partition member 22. Display screen 74 displays an icon labelled "Point 1". Point 1 is the first point on the virtual line that will be determined in the Calibration Mode. Support structure 80, with smart phone 70 and disrupter device 200 attached thereto, is first positioned at a first location with respect to first real world partition member 22. This is indicated by step 452 in FIG. 14E. Point 1 is located at the center point 220 of first real world partition member 22. The user aligns disrupter device 200 so that laser beam 206 is aligned with center point 220 on first real world partition member 22. This process is indicated by step 454 in FIG. 14E. When the alignment is complete, the user touches the "Point 1" icon. As a result, Point 1 is recorded relative to moving (X, Y, Z) coordinate frame 270. This process is indicated by step 456 in FIG. 14E. As stated in the foregoing description, moving (X, Y, Z) coordinate frame 270 moves with camera 72. The 3D camera is now aware of the location of Point 1 relative to camera 72. After Point 1 is recorded, display screen 74 displays an icon labelled "Point 2". Point 2 is the second point on the virtual line that will be determined in the Calibration Mode. Point 2 is the second point in space which is farther away from the camera's moving (X, Y, Z) coordinate frame 270 than Point 1. Although frame 20 cannot be physically moved at this time, Point 2 can still be determined by moving camera 72 and disrupter device 200 backward from first partition member 22. This arrangement is illustrated by the diagram in FIG. 10B and is indicated by step 458 in FIG. 14F. Support structure 80, with smart phone 70 and disrupter device 200 attached thereto, is moved back a distance from first real world partition member 22 and positioned at a second location with respect to first partition member 22. The distance that disrupter device 200 is moved back can be just a few inches or several feet. In this example, disrupter device 200 is moved backward approximately three feet from the corner of first real world partition member 22. The previous positions of smart phone 70 and disrupter device 200 are represented in phantom and indicated by reference numbers 70A and 200A, respectively, shown in FIG. 10B. The previous path of laser beam 206, shown in FIG. 10A, is now represented by the dashed line 206A in FIG. 10B. In this step, Point 2 is located at center point 220 of first real world partition member 22 and Point 1 is now located at the point in space that corresponds to the previous location of the forward end of the barrel of disrupter device 200 (see FIG. 10A). Disrupter device 200 is adjusted again so that laser beam 206 is aligned with center point 220 on first real world partition member 22. This process is indicated by step 460 in FIG. 14F. When the alignment is complete, the user touches the "Point 2" icon. As a result, Point 2 is recorded relative to moving (X, Y, Z) coordinate frame 270. This is indicated by step 462 in FIG. 14F. As stated in the foregoing description, moving (X, Y, Z) coordinate frame 270 moves with camera 72. The 3D camera is now aware of the location of Point 2 relative to camera 72. After these aforementioned steps are completed, the 3D camera is now aware of the location of both Point 1 and Point 2 relative to moving (X, Y, Z) coordinate frame 270. Processor 71 now generates a virtual line between Point 1 and Point 2 and records the position and orientation of this virtual line. This is indicated by step 464 in FIG. 14F. This virtual line is equal to the longitudinally extending axis of the bore or barrel of disrupter 200 in position and orientation and is used as the aiming vector in the Aim Mode which is described in the ensuing description. The Calibration Mode is now complete.

Figure 11:
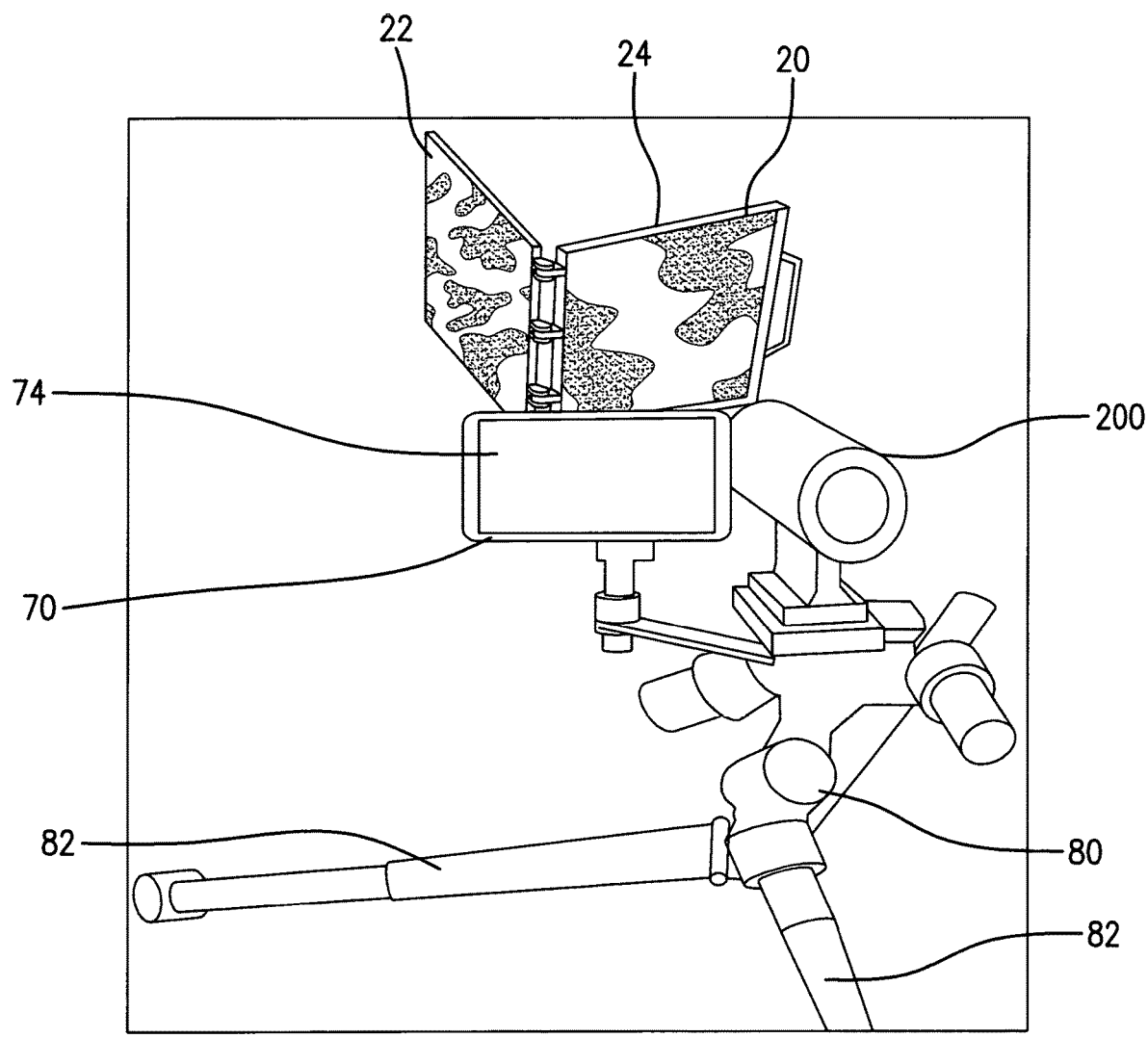
FIG. 11 is a perspective view showing the location of a disrupter device and smart phone camera with respect to the collapsible frame and opaque container, the display screen of the smart phone camera displaying a virtual reality depiction of the interior of the opaque container, the display screen displaying a crosshair symbol that is aligned with the centroid of the suspicious or threatening object shown in FIG. 9.
Figure 12:
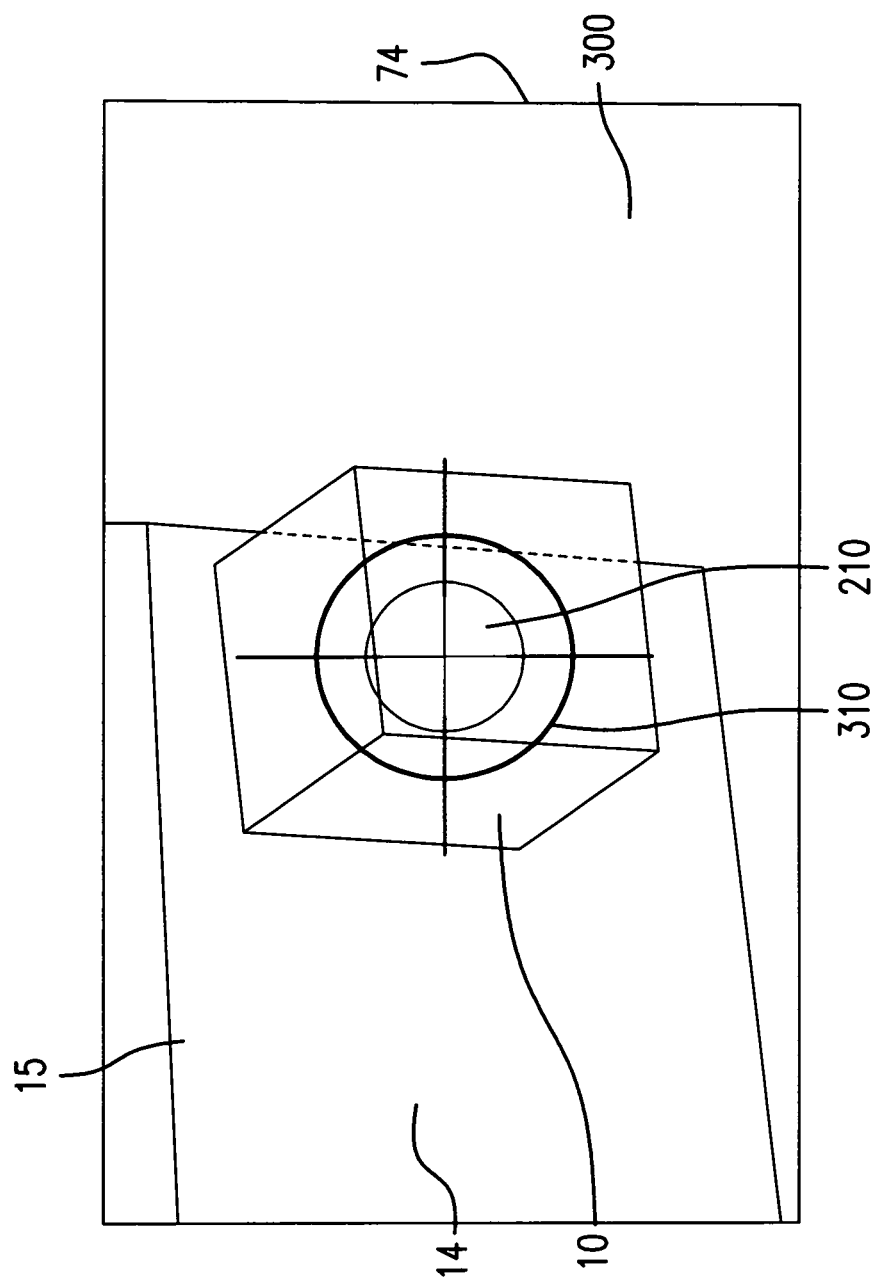
FIG. 12 is an enlarged version of the view that is displayed on the display screen in FIG. 11.

After the Calibration Mode is completed, the Aim Mode automatically begins. Referring to FIGS. 11 and 12, there is shown smart phone 70 and disrupter device 200 mounted to support structure 80. Laser boresighter 204 is within the bore of disrupter device 200 (see FIG. 1) and emits laser beam 206 (see FIGS. 1, 10A and 10B). The view displayed on display screen 74 is that of a virtual reality (VR) view 300 (see FIG. 12) that is based on the virtual items that were created in the Build Mode and based on the real world items shown in x-ray image 160 and x-ray image 162. Virtual reality view 300 shows target 10, hazardous object 15 that is to be avoided and neutral object 14 that is neither a target nor a hazardous item. Therefore, display screen 74 displays a view of a "virtual camera". The virtual reality (VR) view 300, which is to be displayed on display screen 74, is shown in FIG. 12. The view in FIG. 12 shows objects 10, 14 and 15 and sphere 210 which are all shown in the view shown in FIG. 9. In FIG. 12, display screen 74 now displays crosshairs 310 that are located in the center of display screen 74 and are stationary. Crosshairs 310 provide a reference to the center of display screen 74. Specifically, the crosshairs 310 coincides with the virtual aiming vector that was calibrated in the Calibration Mode. Aligning the crosshairs 310 with target 10 actually aligns the center of display screen 74 with target 10 and therefore the aiming vector. Therefore, the "virtual camera" is aligned with the aiming vector calibrated in the Calibration Mode so that when target 10 is within crosshairs 310, it actually means that disrupter device 200 is aimed at target 10. Hence, the view through the virtual camera is actually the view seen looking from the "bore" or "barrel" of disrupter device 200. As a result, the user need only move camera 72 and point it at target 10, similar to taking a photograph, so that target 10 is aligned with crosshairs 310.

Figure 13:
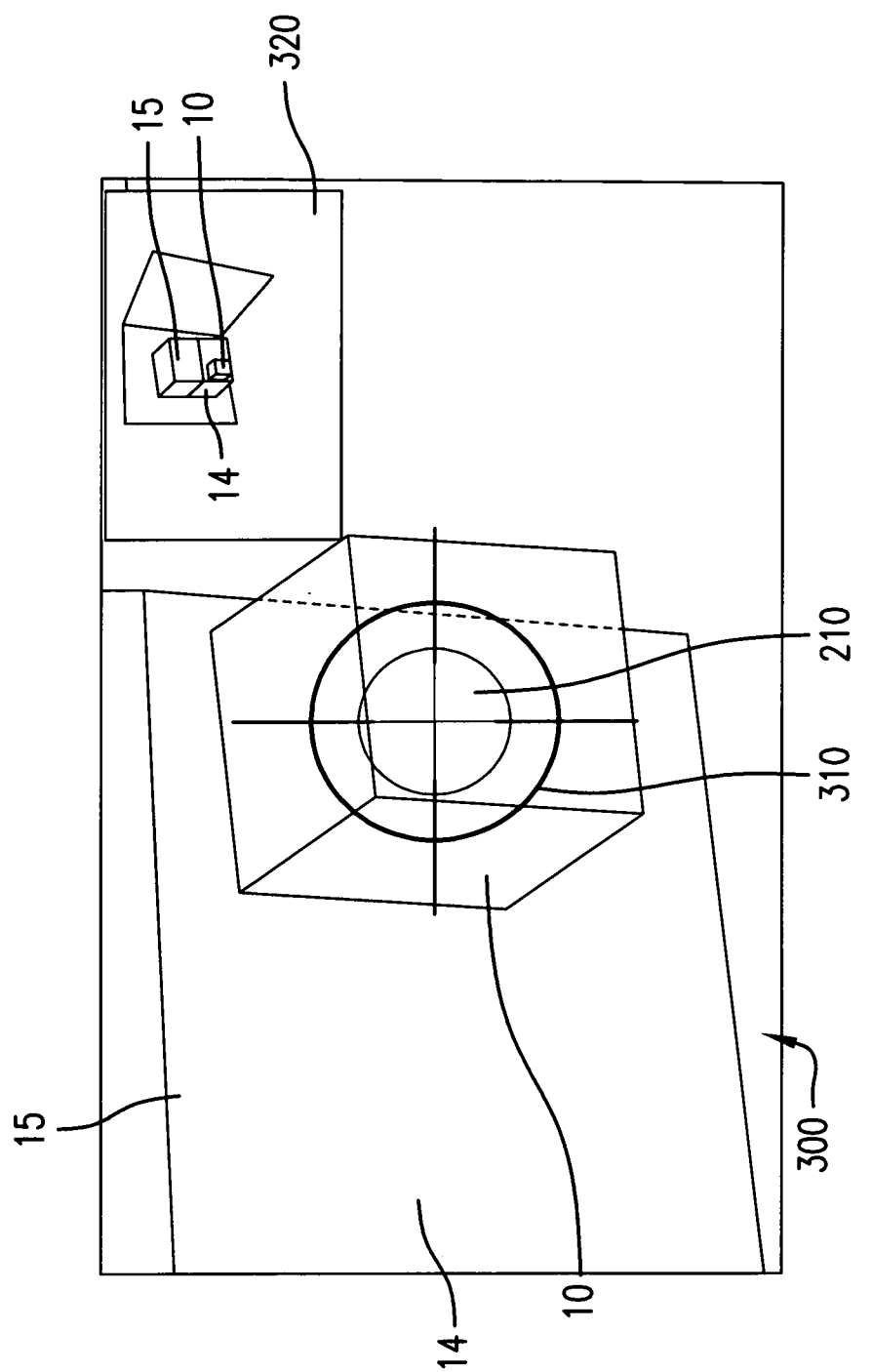
FIG. 13 is a view displayed by the display screen in FIG. 11 which includes both a virtual reality view and an augmented reality view of the interior of the opaque container in accordance with another embodiment.

Referring to FIG. 13, in some embodiments of the Aim Mode, display screen 74 also displays a live-feed augmented reality (AR) view 320 in the corner of display screen 74 while simultaneously displaying view 300. Augmented reality view 320 provides the user with a view of what the aiming vector looks like from the camera standpoint. Specifically, augmented reality view 320 shows target 10, hazardous object 15 and neutral object 14, all of which being positioned within opaque container 12. In other embodiments of the Aim Mode, the augmented reality view 320 is used for calibration monitoring. Such calibration monitoring includes aligning the elements in the augmented reality (AR) view to reference features on frame 20 in order to ensure the alignment of the augmented reality view is correct. This calibration monitoring procedure includes inspecting the augmented reality view right before disrupter device 200 fires the projectile.

Next, frame 20 is removed so that there are no items or objects between disrupter device 200 and opaque container 12. This process is indicated by step 466 in FIG. 14F. Laser boresighter 204 is removed from the bore or barrel of disrupter device 200 and is replaced by the projectile that is to be fired at target 10. The user then fires disrupter device 200 such that the projectile travels along the aiming vector and impacts target 10 at the point defined by crosshairs 310 thereby destroying or disabling target 10. This is indicated by step 468 in FIG. 14F.

In another exemplary, the operations described in the foregoing description may be carried out with a parallel processing platform configured to process more than one data stream simultaneously. In such an embodiment, a first data stream representing image 32 of real world partition member 22 and the corresponding digitized x-ray is processed simultaneously with the processing of a second data stream representing image 40 of real world partition member 24 and the corresponding digitized x-ray image.

The foregoing description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A non-transitory computer readable medium on which is stored machine-readable instructions that when executed by at least one processor, cause the processor to process data to determine the location in 3D space of an object of interest located within an interior of an opaque container, wherein facing one side of the opaque container is a first real world partition member having a first predefined unique image thereon and a first plurality of fiducial markers and wherein facing another side of the opaque container is a second real world partition member having a second predefined unique image thereon and a second plurality of fiducial markers, wherein each partition member defines a plane and the plane defined by one partition member is perpendicular to the plane defined by the other partition member, wherein the stored machine-readable instructions, when executed by the at least one processor, comprising:

causing the at least one processor for receiving a first digitized x-ray image based on x-ray radiation directed at the first real world partition member and which shows the fiducial markers of the first real world partition member and a view of the interior of the opaque container from a first angle;

receiving a second digitized x-ray image based on x-ray radiation being directed at the second real world partition member and which shows the fiducial markers of the second real world partition member and a view of the interior of the opaque container from a second angle;

receiving data representing the first predefined unique image of the first real world partition member and the second predefined unique image of the second real world partition member; and processing the data representing the first predefined unique image and second predefined unique image for generating a virtual reality environment that includes virtual depictions of the first real world partition member with the first predefined unique image thereon and the second real world partition member with the second predefined unique image thereon, wherein the stored machine readable instructions are further configured to, when executed by the at least one processor, cause the at least one processor to, for each real world partition member and corresponding digitized x-ray image:

display, on a display screen, the virtual depiction of the predefined unique image and fiducial markers of the real world partition member, the fiducial markers being shown as a plurality of icons in the virtual depiction, wherein each icon is differentiated from the other icons and wherein the location of each icon corresponds to a location of a corresponding fiducial marker on the real world partition member;

generate a graphical user interface on the display screen;

prompt a user, by the display screen, to use the graphical user interface to select a first icon on the virtual depiction of the real world partition member;

prompt a user, by the display screen, to use the graphical user interface to map the selected first icon with a corresponding fiducial marker shown in the digitized x-ray image corresponding to the real world partition member so as to define a first point;

prompt a user, by the display screen, to use the graphical user interface to select a second icon on the virtual depiction of the real world partition member;

prompt a user, by the display screen, to use the graphical user interface to map the selected second icon with a corresponding fiducial marker shown in the digitized x-ray image corresponding to the real world partition member so as to define a second point;

scale, position and orient the digitized x-ray image corresponding to the real world partition member based on the mapping of the selected first icon and the selected second icon with the respective corresponding fiducial markers shown in the digitized x-ray image that corresponds to the real world partition member;

display, by the display screen, the scaled, positioned and oriented digitized x-ray images so as to enable a user to determine if there is an object of interest inside the opaque container, and wherein if there is an object of interest, the stored machine-readable instructions are further configured to, when executed by the at least one processor, cause the at least one processor to, for each said scaled, positioned and oriented digitized x-ray image:

display, by the display screen, the scaled, positioned and oriented digitized x-ray image and the virtual depiction of the predefined image of the real world partition member that corresponds to the scaled, positioned and oriented digitized x-ray image;

prompt a user, by the display screen, to use the graphical interface to select a reference geometrical shape from a plurality of reference geometrical shapes and drag the selected reference geometrical shape over the scaled, positioned and oriented digitized x-ray image; and prompt a user, by the display screen, to use the graphical interface to match the selected reference geometrical shape to an X-Y coordinate of the object of interest shown in the scaled, positioned and oriented digitized x-ray image so as to determine a location of the object of interest in 3D space in relation to the virtual depiction of the predefined images on the real world partition members.

2. The non-transitory computer readable medium according to claim 1, wherein the stored machine-readable instructions are further configured to route the first digitized x-ray image and the second digitized x-ray image to at least one memory medium that is in electronic data communication with the at least one processor.

3. The non-transitory computer readable medium according to claim 1, wherein the at least one processor is in electronic data communication with an image recording device that is operatively associated with and attached to a disrupter device such that the image recording device physically moves with the disrupter device, wherein the disrupter device is configured to fire a projectile at the object of interest in order to one of disable and destroy the object of interest, wherein the disrupter device includes a barrel from which the projectile is fired, and wherein the barrel has a longitudinally extending axis.

4. The non-transitory computer readable medium according to claim 3, wherein the disrupter device includes a laser boresighter to generate a laser beam that is collinear with the longitudinally extending axis, wherein the stored machine-readable instructions are further configured to cause the at least one processor to generate a virtual line that is collinear with the longitudinally extending axis of the barrel and which extends to the object of interest, and wherein the virtual line defines an aiming vector along which the projectile will travel upon exiting the barrel of the disrupter device.

5. The non-transitory computer readable medium according to claim 3, wherein the disrupter device includes a laser boresighter to generate a laser beam that is collinear with the longitudinally extending axis, wherein the stored machine-readable instructions are further configured to cause the at least one processor to generate a virtual line that is collinear with the longitudinally extending axis of the barrel and which extends to the object of interest, and wherein the virtual line defines an aiming vector along which the projectile will travel upon exiting the barrel of the disrupter device, wherein the image recording device comprises a camera lens that has a center to define a moving (X, Y, Z) coordinate frame, and wherein the stored machine-readable instructions are further configured to cause the at least one processor to:

prompt the user, by the display screen, to use the graphical user interface to select one of the real world partition members of the frame, wherein the selected real world partition member has a center point and a bottom corner, and wherein the bottom corner defines a static (X, Y, Z) coordinate frame;

prompt the user, by the display screen, to position the disrupter device at a first distance from the center point of the selected real world partition member;

prompt the user, by the display screen, to align the laser beam of the laser boresighter with the center point of the selected real world partition member;

record a first point in space relative to the moving (X, Y, Z) coordinate frame, wherein the first point is at the center point of the selected real world partition member;

prompt the user, by the display screen, to re-position the disrupter device and image recording device at a second distance from the center point of the selected real world partition member, wherein the second distance is greater than the first distance, and wherein the first point in space is now spaced apart from the center point of the selected real world partition member by the second distance;

prompt the user, by the display screen, to align the laser beam of the laser boresighter with the center point of the selected real world partition member;

record a second point in space relative to the moving (X, Y, Z) coordinate frame, wherein the second point is now at the center point of the selected real world partition member;
generate a virtual line between the first point and the second point; and
record the position and orientation of this virtual line.

6. The non-transitory computer readable medium according to claim 3, wherein the stored machine-readable instructions are further configured to cause the at least one processor to:
prompt the user, by the display screen, to remove the first real world partition member and the second real world partition member; and
prompt the user, by the display screen, to fire the disrupter device at the object of interest, wherein the projectile travels along the aiming vector to the object of interest.

7. The non-transitory computer readable medium according to claim 1, wherein the stored machine-readable instructions are further configured to cause the at least one processor to:
determine orthogonality of x-ray radiation with respect to the first real world partition member; and
determine orthogonality of x-ray radiation respect to the second real world partition member.

8. The non-transitory computer readable medium according to claim 1, wherein the stored machine readable instructions are further configured to cause the at least one processor to:
generate a virtual depiction of the objects inside the opaque container; and
colorize the object of interest with a first color, hazardous objects with a second color and objects that are neither of interest nor hazardous with a third color.

9. The non-transitory computer readable medium according to claim 1, wherein the stored machine-readable instructions are further configured to cause the at least one processor to:
determine a centroid of the object of interest;
generate indicia at the centroid of the object of interest; and
display, by the display screen, the indicia at the centroid of the object of interest.

10. The non-transitory computer readable medium according to claim 9, wherein the stored machine-readable instructions are further configured to cause the at least one processor to generate the indicia in the form of a geometrical shape.

11. The non-transitory computer readable medium according to claim 1, wherein the stored machine-readable instructions are further configured to cause the at least one processor to generate each icon with a different color so that each icon is differentiated from the other icons.

12. A computing device, comprising:
at least one processor;
a display screen being in electronic data communication with the at least one processor;
an image recording device being in electronic data communication with the at least one processor, wherein the image recording device comprises a camera lens that has a center that defines a moving (X, Y, Z) coordinate frame;
at least one non-transitory computer readable medium on which is stored machine readable instructions that when executed by the at least one processor causing the at least one processor to process data for determining the location in 3D space of an object of interest located within an interior of an opaque container, wherein the opaque container includes one side and another side, wherein one side of the opaque container faces a first real world partition member having a first predefined unique image thereon and a first plurality of fiducial markers,
wherein another side of the opaque container faces a second real world partition member having a second predefined unique image thereon and a second plurality of fiducial markers,
wherein each of the first real world partition member and the second real world partition member defines a plane and a first plane defined by the first real world partition member is perpendicular to a second plane defined by the second real world partition member,
wherein the stored machine readable instructions, when executed by the at least one processor, cause the at least one processor to:
receive a first digitized x-ray image based on x-ray radiation directed at the first real world partition member and which shows the fiducial markers of the first real world partition member and a view of the interior of the opaque container from a first angle;
receive a second digitized x-ray image based on x-ray radiation directed at the second real world partition member and which shows the fiducial markers of the second real world partition member and a view of the interior of the opaque container from a second angle;
receive data representing the first predefined unique image of the first real world partition member and the second predefined unique image of the second real world partition member;
process the data representing the first predefined unique image and second predefined unique image to generate a virtual reality environment that includes virtual depictions of the first real world partition member with the first predefined unique image thereon and the second real world partition member with the second predefined unique image thereon;
wherein the stored machine readable instructions are further configured to, when executed by the at least one processor, cause the at least one processor to, for each real world partition member and corresponding digitized x-ray image:
display, on the display screen, the virtual depiction of the predefined unique image and fiducial markers of the real world partition member, the fiducial markers being shown as a plurality of icons in the virtual depiction, wherein each icon is differentiated from the other icons and wherein the location of each icon corresponds to a location of a corresponding fiducial marker on the real world partition member;
generate a graphical user interface on the display screen;
prompt a user, by the display screen, to use the graphical user interface to select a first icon on the virtual depiction of the real world partition member;
prompt a user, by the display screen, to use the graphical user interface to map the selected first icon with a corresponding fiducial marker shown in the digitized x-ray image corresponding to the real world partition member so as to define a first point;
prompt a user, by the display screen, to use the graphical user interface to select a second icon on the virtual depiction of the real world partition member;
prompt a user, by the display screen, to use the graphical user interface to map the selected second icon with a corresponding fiducial marker shown in the digital x-ray image corresponding to the real world partition member so as to define a second point;

scale, position and orient the digitized x-ray image corresponding to the real world partition member based on the mapping of the selected first icon and the selected second icon with the respective corresponding fiducial markers shown in the digitized x-ray image that corresponds to the real world partition member;

display, by the display screen, the scaled, positioned and oriented digitized x-ray images so as to enable a user to determine if there is an object of interest inside the opaque container, and wherein if there is an object of interest, the stored machine readable instructions are further configured to, when executed by the at least one processor, cause the at least one processor to, for each scaled, positioned and oriented digitized x-ray image:

display, by the display screen, the scaled, positioned and oriented digitized x-ray image and the virtual depiction of the predefined image of the real world partition member that corresponds to the scaled, positioned and oriented digitized x-ray image;

prompt a user, by the display screen, to use the graphical interface to select a reference geometrical shape from a plurality of reference geometrical shapes and drag the selected reference geometrical shape over the scaled, positioned and oriented digital x-ray image; and prompt a user, by the display screen, to use the graphical interface to match the selected reference geometrical shape to an X-Y coordinate of the object of interest shown in the scaled, positioned and oriented digitized x-ray image so as to determine a location of the object of interest in 3D space in relation to the virtual depiction of the predefined images on the real world partition members.

13. The computing device according to claim 12, further comprising at least one memory being in electronic data communication with the at least one processor, wherein the stored machine readable instructions are further configured to cause the at least one processor to route the first digitized x-ray image and the second digitized x-ray image to the at least one memory.

14. The computing device according to claim 12, wherein the image recording device is operatively associated with and attached to a disrupter device such that the image recording device physically moves with the disrupter device, wherein the disrupter device is configured to fire a projectile at the object of interest in order to one of disable and destroy the object of interest, and wherein the disrupter device includes a barrel from which the projectile is fired, and wherein the barrel has a longitudinally extending axis.

15. The computing device according to claim 14, wherein the disrupter device includes a laser boresighter configured to generate a laser beam that is collinear with the longitudinally extending axis, wherein the stored machine readable instructions are further configured to cause the at least one processor to generate a virtual line that is collinear with the longitudinally extending axis of the barrel and which extends to the object of interest, and wherein the virtual line defines an aiming vector along which the projectile will travel upon exiting the barrel of the disrupter device.

16. The computing device according to claim 14, wherein the disrupter device includes a laser boresighter configured to generate a laser beam that is collinear with the longitudinally extending axis, wherein the stored machine readable instructions are further configured to cause the at least one processor to generate a virtual line that is collinear with the longitudinally extending axis of the barrel and which extends to the object of interest, wherein the virtual line defines an aiming vector along which the projectile will travel upon exiting the barrel of the disrupter device, and wherein the stored machine readable instructions are further configured to cause the at least one processor to:

prompt the user, by the display screen, to use the graphical user interface to select one of the real world partition members of the frame, wherein the selected real world partition member has a center point and a bottom corner, wherein the bottom corner defines a static (X, Y, Z) coordinate frame;

prompt the user, by the display screen, to position the disrupter device at a first distance from the center point of the selected real world partition member;

prompt the user, by the display screen, to align the laser beam of the laser boresighter with the center point of the selected real world partition member;

record a first point in space relative to the moving (X, Y, Z) coordinate frame of the image recording device, wherein the first point is at the center point of the selected real world partition member;

prompt the user, by the display screen, to re-position the disrupter device and image capturing device at a second distance from the center point of the selected real world partition member, wherein the second distance is greater than the first distance, and wherein the first point in space is now spaced apart from the center point of the selected real world partition member by the second distance;

prompt the user, by the display screen, to align the laser beam of the laser boresighter with the center point of the selected real world partition member;

record a second point in space relative to the moving (X, Y, Z) coordinate frame of the image recording device, wherein the second point is now at the center point of the selected real world partition member;

generate a virtual line between the first point and the second point; and record the position and orientation of this virtual line between the first point and the second point.

17. The computing device according to claim 14, wherein the stored machine readable instructions are further configured to cause the at least one processor to:

prompt the user, by the display screen, to remove the first real world partition member and the second real world partition member; and prompt the user, by the display screen, to operate the disrupter device so as to fire a projectile at the target of interest, wherein the projectile travels along the aiming vector.

18. The computing device according to claim 12, wherein the stored machine readable instructions are further configured to cause the at least one processor to:

determine orthogonality of the x-ray radiation with respect to the first real world partition member; and determine orthogonality of the x-ray radiation respect to the second real world partition member.

19. The computing device according to claim 12, wherein the stored machine readable instructions are further configured to cause the at least one processor to:

generate a virtual depiction of the objects inside the opaque container; and colorize the object of interest with a first color, hazardous objects with a second color and objects that are neither of interest nor hazardous with a third color.

20. The computing device according to claim 12, wherein the stored machine readable instructions are further configured to cause the at least one processor to:
- determine a centroid of the object of interest;
- generate indicia at the centroid of the object of interest; and
- display, by the display screen, the indicia at the centroid of the object of interest.

21. The computing device according to claim 20, wherein the stored machine readable instructions are further configured to cause the at least one processor to generate the indicia in the form of a geometrical shape.

22. The computing device according to claim 12, wherein the stored machine readable instructions are further configured to cause the at least one processor to generate each icon with a different color so that each icon is differentiated from the other icons.

23. The computing device according to claim 12, wherein the computing device comprises a mobile computing device.

24. The computing device according to claim 12, wherein the computing device comprises a tablet computing device.

25. The computing device according to claim 12, wherein the computing device comprises a personal computing device.

26. A non-transitory computer readable medium on which is stored machine-readable instructions that when executed by at least one processor, comprising:
- causing the processor for processing data for determining the location in 3D space of an object of interest located within an interior of an opaque container, wherein the opaque container comprises one side and another side, wherein one side of the opaque container faces a first real world partition member having a first predefined unique image thereon and a first plurality of fiducial markers, wherein another side of the opaque container faces a second real world partition member having a second predefined unique image thereon and a second plurality of fiducial markers, wherein each of the first and second real world partition members defines a first plane and a second plane, respectively, and wherein the first plane defined by the first real world A partition member is perpendicular to the second plane defined by the second real world partition member;
- causing the at least one processor for receiving a first digitized x-ray image based on x-ray radiation being directed at the first real world partition member and which shows the fiducial markers of the first real world partition member and a view of the interior of the opaque container from a first angle;
- receiving a second digitized x-ray image based on x-ray radiation being directed at the second real world partition member and which shows the fiducial markers of the second real world partition member and a view of the interior of the opaque container from a second angle;
- receiving data representing the first predefined unique image of the first real world partition member and the second predefined unique image of the second real world partition member; and
- processing the data representing the first predefined unique image and second predefined unique image for generating a virtual reality environment that includes virtual depictions of the first real world partition member with the first predefined unique image thereon and the second real world partition member with the second predefined unique image thereon, wherein the stored machine readable instructions are further configured to, when executed by the at least one processor, cause the at least one processor to, for each real world partition member and corresponding digitized x-ray image:
- display, on a display screen, the virtual depiction of the predefined unique image and fiducial markers of the real world partition member, the fiducial markers being shown as a plurality of icons in the virtual depiction, wherein each icon is differentiated from the other icons and wherein the location of each icon corresponds to a location of a corresponding fiducial marker on the real world partition member;
- generate a graphical user interface on the display screen;
- prompt a user, by the display screen, to use the graphical user interface to select a first icon on the virtual depiction of the real world partition member;
- prompt a user, by the display screen, to use the graphical user interface to map the selected first icon with a corresponding fiducial marker shown in the digitized x-ray image corresponding to the real world partition member so as to define a first point;
- prompt a user, by the display screen, to use the graphical user interface to select a second icon on the virtual depiction of the real world partition member;
- prompt a user, by the display screen, to use the graphical user interface to map the selected second icon with a corresponding fiducial marker shown in the digitized x-ray image corresponding to the real world partition member so as to define a second point;
- scale, position and orient the digitized x-ray image corresponding to the real world partition member based on the mapping of the selected first icon and the selected second icon with the respective corresponding fiducial markers shown in the digitized x-ray image that corresponds to the real world partition member; and
- display, by the display screen, the scaled, positioned and oriented digitized x-ray images so as to enable a user to determine if there is an object of interest inside the opaque container, and wherein if there is an object of interest, the stored machine-readable instructions are further configured to, when executed by the at least one processor, cause the at least one processor to, for each said scaled, positioned and oriented digitized x-ray image:
- display, by the display screen, the scaled, positioned and oriented digitized x-ray image and the virtual depiction of the predefined image of the real world partition member that corresponds to the scaled, positioned and oriented digitized x-ray image;
- prompt a user, by the display screen, to use the graphical interface to select a reference geometrical shape from a plurality of reference geometrical shapes and drag the selected reference geometrical shape over the scaled, positioned and oriented digitized x-ray image; and
- prompt a user, by the display screen, to use the graphical interface to match the selected reference geometrical shape to an X-Y coordinate of the object of interest shown in the scaled, positioned and oriented digitized x-ray image so as to determine a location of the object of interest in 3D space in relation to the virtual depiction of the predefined images on the real world partition members.

\* \* \* \* \*